(12) United States Patent
Wallace et al.

(10) Patent No.: US 10,560,283 B2
(45) Date of Patent: *Feb. 11, 2020

(54) SYSTEM AND METHOD FOR A MULTI-TENANT DATACENTER WITH LAYER 2 INTERCONNECTION AND CLOUD STORAGE

(71) Applicant: The Faction Group LLC, Denver, CO (US)

(72) Inventors: Matthew Alan Wallace, Highlands Ranch, CO (US); Luke Matthew Norris, Denver, CO (US); Bryan James Gallant, Thornton, CO (US); Hooker Ashley Heggestad, Lafayette, CO (US)

(73) Assignee: THE FACTION GROUP LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/104,834

(22) Filed: Aug. 17, 2018

(65) Prior Publication Data

US 2018/0367341 A1   Dec. 20, 2018

Related U.S. Application Data

(63) Continuation-in-part of application No. 15/424,651, filed on Feb. 3, 2017, now Pat. No. 10,382,229, which
(Continued)

(51) Int. Cl.
*H04L 12/46* (2006.01)
*H04L 29/08* (2006.01)
*H04L 12/721* (2013.01)

(52) U.S. Cl.
CPC ........ *H04L 12/4666* (2013.01); *H04L 12/465* (2013.01); *H04L 12/4633* (2013.01);
(Continued)

(58) Field of Classification Search
CPC .......... H04W 72/0453; H04W 72/042; H04W 72/0446; H04W 72/1257; H04W 36/00;
(Continued)

(56) References Cited

U.S. PATENT DOCUMENTS

| 2011/0022721 A1* | 1/2011 | Diab ...................... H04L 69/08 709/233 |
| 2011/0075667 A1 | 3/2011 | Li et al. |

(Continued)

OTHER PUBLICATIONS

PCT International Search Report for International Application PCT/US2013/021662, search report data dated Apr. 29, 2013 (dated Apr. 28, 2013).
(Continued)

*Primary Examiner* — Hardikkumar D Patel
(74) *Attorney, Agent, or Firm* — Daniel W. Roberts; Law Offices of Daniel W. Roberts, LLC

(57) ABSTRACT

Provided is a system and method for a multi-tenant datacenter with layer 2 cloud interconnection and cloud storage. More specifically, the datacenter providing cloud storage, includes a plurality of Client Systems coupled to a first datacenter each Client System having a set of infrastructure resources and an initial networking configuration; and a first cloud computing environment established in the first datacenter, and coupled to the Client Systems by OSI Layer 2 as a data link layer for the transfer of data frames, each frame having a plurality of OSI Layer 2 tags, the first cloud computing environment providing storage resources for allocation to at least two Client Systems, the plurality of OSI Layer 2 tags permitting the at least two Client Systems to have overlapping network configurations. An associated method of providing a multi-tenant datacenter with layer 2 cloud interconnection and cloud storage is also provided.

62 Claims, 12 Drawing Sheets

Related U.S. Application Data is a continuation of application No. 14/621,320, filed on Feb. 12, 2015, now Pat. No. 9,621,374, which is a continuation of application No. 13/356,555, filed on Jan. 23, 2012, now Pat. No. 9,571,301.

(52) U.S. Cl.
CPC .......... *H04L 12/4641* (2013.01); *H04L 67/10* (2013.01); *H04L 45/66* (2013.01); *H04L 67/1097* (2013.01); *H04L 69/324* (2013.01); *H04L 2212/00* (2013.01)

(58) Field of Classification Search
CPC . H04W 36/08; H04W 36/0077; H04W 36/38; H04W 56/0005; H04W 56/0045; H04W 36/14; H04W 88/06; H04W 40/22; H04L 5/0005; H04L 5/14; H04L 5/26; H04L 12/4666; H04L 12/4633; H04L 12/4641; H04L 12/465; H04L 45/66; H04L 67/10; H04L 67/1097; H04L 69/324; H04L 69/08; H04L 69/32; H04L 12/24; H04L 12/4679; H04L 41/50; H04L 12/56; H04L 49/70; H04L 1/1854; H04L 1/1861; H04L 5/0053; H04L 2001/0097; G06F 15/16; G06F 9/45558; G06F 2009/45595; H04B 7/155
See application file for complete search history.

(56) References Cited

U.S. PATENT DOCUMENTS

| | | | |
|---|---|---|---|
| 2011/0090911 A1* | 4/2011 | Hao | H04L 12/4633 370/395.53 |
| 2012/0020206 A1 | 1/2012 | Busi et al. | |
| 2012/0233668 A1 | 9/2012 | Leafe et al. | |
| 2012/0281706 A1 | 11/2012 | Agarwal et al. | |
| 2013/0107887 A1 | 5/2013 | Pearson et al. | |
| 2013/0124750 A1 | 5/2013 | Anumal et al. | |
| 2013/0346583 A1* | 12/2013 | Low | H04L 12/4641 709/223 |
| 2014/0115584 A1 | 4/2014 | Mudigonda et al. | |

OTHER PUBLICATIONS

PCT International Search Report for International Application PCT/US2013/021662, search report data dated Sep. 30, 2013 (dated Sep. 30, 2013).

Radia Perlman Intel Labs Dinesh Dutt CISCO Systems Donald Eastlake $3^{rd}$ Stellar Switches Mar. 7, 2010.

Carrier Ethernet: The native approach Howard Gree, Sylvain Monette, Jonathan Olsson, Panagiotis Salsidis and Attila Takács, pp. 84-89.

\* cited by examiner

SYSTEM AND METHOD FOR A MULTI-TENANT DATACENTER WITH LAYER 2 INTERCONNECTION AND CLOUD STORAGE

CROSS-REFERENCE TO RELATED APPLICATIONS

The present application is a Continuation in Part of U.S. patent application Ser. No. 15/424,651 filed Feb. 3, 2017, published as US2017/0149896, May 25, 2017, the disclosure of which is incorporated herein by reference, which in turn is a Continuation of U.S. patent application Ser. No. 14/621,320 filed Feb. 12, 2015, published as US2017/0005832, now U.S. Pat. No. 9,621,374 the disclosure of which is incorporated herein by reference, which in turn is a continuation of U.S. patent application Ser. No. 13/356,555 filed Jan. 23, 2012, published as US2013/0188512, now U.S. Pat. No. 9,571,301, the disclosure of which is incorporated herein by reference. Moreover, this Continuation in Part application claims the benefit of the filing date of U.S. patent application Ser. No. 13/356,555, filed Jan. 23, 2012.

FIELD OF THE INVENTION

The present invention relates generally to systems and methods for flexible network infrastructure, and more specifically to a multi-tenant datacenter with Layer 2 cloud interconnection. This multi-tenant data center permits transparent extension of infrastructure resources, such as storage.

BACKGROUND

Computer systems, and more specifically networked computer systems are a center point of modern society. Advances in production and miniaturization have permitted the production of increasingly faster processors and larger data storage.

Commerce, and indeed business in general is highly reliant on networked computer systems for nearly all aspects of business activity, such as but not limited to offering products for sale, maintaining account records, analyzing data, etc. . . . Yet, the needs for resources may and often do change from time to time.

Networks exist in a variety of forms, from the vast and expansive nature of the Internet to the small local area network of a company or home setting. Whereas it was once commonplace to provide all desired computer resources within one physical system, networking systems permit a greater flexibility in adaptively balancing resources and scaling to meet needs. Network connection and integration requires an ability for the elements, e.g. systems, of the intended network to find and communicate with each other.

The Open System Interconnection model, also referred to as the Open Source Interconnection model or more simply the OSI model, is a product of the Open System Interconnection effort at the International Organization for Standardization, and more specifically is a prescription of characterizing and standardizing the functions of a communication system in terms of seven abstraction layers of concentric organization—Layer 1 the physical layer, Layer 2 the data link layer, Layer 3 the network layer, Layer 4 the transport layer, Layer 5 the session layer, Layer 6 the presentation layer, and Layer 7 the application layer.

Each layer is generally known as an N Layer. At each layer, two entities, i.e., N-entity peers, interact by means of the N protocol by transmitting protocol data units or "PDU".

A Service Data Unit "SDU" is a specific unit of data that has been passed down from one layer to another, and for which the lower layer has not yet encapsulated into a PDU. Moreover the PDU of any given layer, Layer N, is the SDU of the layer below, layer N−1. In other words, the SDU is the payload of a given PDU.

Transfer of an SDU between layers is therefore a matter of encapsulation and is performed by the lower layer in adding appropriate headers and or footers to the SDU such that it becomes a PDU. These headers and or footers are part of the communication process permitting data to get from a source to a destination within any network.

Briefly, Layer 1, the physical layer defines the electrical and physical specifications of the device and the communication medium, e.g., copper cable, optical cable, wireless, etc. Layer 2, the data link layer, provides the functional and procedural means to transfer data from one entity to another, and to possibly correct errors that may occur in the physical layer. The data is arranged in logical sequences known as frames.

Layer 3 is the network layer and provides the functional and procedural means of transferring variable length data sequences from a source on one network to a destination host on a different network. Routers operate at this layer and make the Internet possible by properly handling the interconnections and handoffs between different networks. Layer 4 is the transport layer responsible for data transfer between end users and the reliability of a given link through flow control, segmentation/desegmentation and error control.

Layers 5, 6 and 7 as the Session, Presentation and Application layer are successively higher and closer to the user and subsequently further and further away from the physical layer. The greater the number of transfers between layers to accomplish any given task, the greater the complexity, latency and general opportunity for error.

Indeed within a typical local area network (LAN), wherein the systems are indeed part of the same network, the communication of data transfer is generally accomplished at the Layer 2 level. However, when joining one LAN to another, or to a wide area network (WAN), the addresses of the LAN may be meaningless or perhaps even duplicative of other addresses in other LANs and as such the translation to Layer 3 is the generally accepted method for maintaining harmony in communication.

While this is a viable option, and indeed the existence of the Internet demonstrates overall functionality, it does often come with overhead costs and burdens of complexity. For example, whereas a database within a LAN may be communicated with via Layer 2 and thereby enjoy enhanced integration as a networked component, accessing a similar database over Layer 3 requires Internet Protocol "IP" address translation, or other similar transformation which by it's vary nature requires the originating system to be configured for, and perhaps engage in appropriate measures for proper identification, and addressing of data to and from the remote database as would not be otherwise required with a LAN based database. For example the LAN systems may be on one network or VLAN and the remote database is part of another network or VLAN—the differences requiring at the very least a router to adjust and account for the differences in network identity and configuration.

Indeed, while remote services do provide a lower cost option to the direct acquisition of hardware and thereby permit enhanced scalability of resources in response to needs, the remote services as offered to a plurality of needy parties are not perceived by each party simply as an extension of his or her existing resources.

One form of remote service is that of cloud computing, wherein a collection of physical systems provide both physical and virtualized resources. Although gaining in popularity, cloud computing and the integration of these resources is performed at Layer 3 so as to permit the generally accepted methodologies of IP protocol translations to insure proper segregation of data.

Moreover, as many LANs are configured with default options it is very common for multiple end users to have the same local IP addresses within their various networks. For connection to and utilization of a traditional cloud environment network address translation must be employed—a requirement that is often beyond the skills and capability of the end user. When the needs for such resources are dynamic, such continual adjustments and additions through Layer 3 IP addresses can be taxing in terms of time, costs, and possible error among other factors.

Further, the resources of a cloud environment are also generally limited due to one or more physical constraints. Although perhaps expandable to a point, such expansion cannot generally be achieved in real time as at some point additional physical systems must be installed, configured and integrated. And again, once such systems have been integrated, if the need for resources diminishes they cannot easily be taken out of use without again physical interaction.

With respect to the issue of storage in a multi-tenant cloud environment, the variety of different networking schemes can be an issue. Clients located in the cloud or in adjacent clouds can, and often do, have highly overlapping network configurations. In addition, for purposes of providing scalability, redundancy and operational resiliency, traditional overlapping network issues may be exacerbated as storage solutions have traditionally been provided at OSI Layer 3.

The issue of redundancy and resiliency may benefit from further comment—storage of data is quite important, but hardware devices do fail and or require maintained, replacement and upgrade from time to time. At least two factors are therefore at issue—it is highly desirable not to lose data, and the data must be available when needed.

In order to protect against disaster scenarios, client systems with storage arrays often desire to replicate storage between storage targets—and often in different physical locations. There is an operational challenge in failing over between storage targets in the case of failures that are simplified for client systems if the redundancy is handled transparently—which is highly desired from the client's point of view.

Traditionally, storage arrays provide virtualization functionality where subsets of resources of the storage array are provided to client systems through the implementation of some form of virtual storage machine. To the client system, this virtualized storage system is desired to act like a dedicated storage array, or at least in a manner consistent with a dedicated storage array. Those skilled in the art will understand and appreciate that although virtualized storage systems may be desired in some embodiments, physical storage systems in place of virtualized storage systems, and or a mix of physical storage and virtual storage systems may be implemented without departing from the scope of the present invention.

Presently, the traditional virtualized storage systems cannot transparently handle the wide range of possibilities in overlapping network configurations.

Moreover, although cloud computing does provide an improvement in many ways over previous options for expansion and contraction of resources to meet needs, it is not without it's own set of challenges and difficulties.

It is to innovations related to this subject matter that the claimed invention is generally directed.

SUMMARY

Embodiments of this invention provide a system and method for a multi-tenant datacenter with Layer 2 cloud interconnection.

In particular, and by way of example only, according to one embodiment of the present invention, provided is a multi-tenant datacenter, including: a plurality of physical client systems in a first datacenter each physical client system having a set of physical infrastructure resources; a first cloud computing environment established in the first datacenter, and coupled to the physical client systems by OSI Layer 2, the first cloud computing environment thereby virtually extending the physical infrastructure resources of each physical client system.

In another embodiment, provided is a method for providing a multi-tenant datacenter, including: establishing within a first datacenter a first cloud computing environment; locating at least one physical client systems in the first datacenter, each physical client having a set of physical infrastructure resources; and coupling the at least one physical client system to the first cloud computing environment by OSI Layer 2, the OSI Layer 2 coupling virtually extending the physical infrastructure resources of each physical client system.

In yet another embodiment, provided is a method for providing a multi-tenant datacenter, including: establishing within a first datacenter a first cloud computing environment; locating a plurality of physical client system in the first datacenter, each physical client system having a set of physical infrastructure resources; and uniquely identifying data traffic as between each client system and the first cloud computing environment by a plurality of OSI Layer 2 tags as unique identifiers permitting unique identification for each client system of at least one host and a customer.

Still further, in another embodiment, provided is a method for providing a multi-tenant datacenter, including: establishing within a first datacenter a first cloud computing environment having first physical resources and first virtual resources; establishing within a second datacenter a second cloud computing environment having second physical resources and second virtual resources; and coupling the first cloud computing environment to the second cloud computing environment by OSI Layer 2.

Further, in another embodiment, provided is a datacenter providing cloud storage for Client Systems (CS), utilizing OSI Layer 2 tags to segregate transmission data between Client Systems (CS) and the datacenter providing cloud storage, comprising: a plurality of Client Systems (CS) coupled to a first datacenter each Client System (CS) having a set of infrastructure resources and an initial networking configuration; and a first cloud computing environment established in the first datacenter, and coupled to the Client Systems (CS) by OSI Layer 2 as a data link layer for the transfer of data frames, each frame having a plurality of OSI Layer 2 tags, the first cloud computing environment providing storage resources for allocation to at least two Client Systems (CS), the plurality of OSI Layer 2 tags permitting the at least two Client Systems (CS) to have overlapping network configurations.

Still further, in another embodiment, provided is a method for providing a cloud storage datacenter, utilizing OSI Layer 2 tags to segregate transmission data between Client Systems (CS), comprising: establishing within a first datacenter a first cloud computing environment providing storage resources for allocation to at least two Client Systems (CS); connecting a plurality of Client Systems (CS) to the first datacenter, each Client System (CS) having a set of infrastructure resources and an initial networking configuration; provisioning storage resources to at least one Client System (CS); and uniquely identifying Layer 2 data traffic as between each Client System (CS) and the first cloud computing environment over OSI Layer 2 as a data link layer for the transfer of data frames distinct from the transfer of packets of a network layer, each frame having a plurality of OSI Layer 2 tags as unique identifiers permitting unique identification for each Client System (CS), the OSI Layer 2 tags permitting segregation between Client Systems (CS) to permit at least two Client Systems (CS) to have overlapping network configurations.

Further still, in another embodiment, provided is a datacenter providing cloud storage for Client Systems (CS), utilizing OSI Layer 2 tags to segregate transmission data in Layer 2 Frames, comprising: a first datacenter (FDC) providing a first cloud computing environment having Layer 2 architecture to maintain a plurality of original client Layer 2 configurations, the first datacenter having first physical resources and first virtual resources structured and arranged to provide storage resources for allocation to at least two Client Systems (CS); a second datacenter (SDC) providing a second cloud computing environment having Layer 2 architecture to maintain a plurality of original client Layer 2 configurations, the second datacenter having second physical resources and second virtual resources structured and arranged to provide storage resources for allocation to at least two Client Systems (CS), and coupled to the first datacenter by OSI Layer 2 as a data link layer for the transfer of data frames, each frame having a plurality of OSI Layer 2 tags, the plurality of OSI Layer 2 tags permitting at least two systems utilizing the coupled first datacenter and second datacenter to have overlapping network configurations.

And yet further, in another embodiment, provided is a method for providing a datacenter having Layer 2 architecture to segregate and maintain original client Layer 2 configurations and permit software defined networking, comprising: establishing within a first datacenter a first cloud computing environment having Layer 2 architecture to maintain a plurality of original client Layer 2 configurations, the first datacenter having first physical resources and first virtual resources structured and arranged to provide storage resources for allocation to at least two Client Systems (CS); establishing within a second datacenter a second cloud computing environment having Layer 2 architecture to maintain a plurality of original client Layer 2 configurations, the second datacenter having second physical resources and second virtual resources structured and arranged to provide storage resources for allocation to at least two Client Systems (CS); and coupling the first cloud computing environment to the second cloud computing environment by OSI Layer 2 as a data channel for the transfer of data frames, each frame having a plurality of OSI Layer 2 tags, the plurality of OSI Layer 2 tags permitting segregation between systems so at least two systems utilizing the coupled first datacenter and second datacenter may have overlapping network configurations.

BRIEF DESCRIPTION OF THE DRAWINGS

At least one system and method for a multi-tenant datacenter with Layer 2 cloud interconnection will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific of system or method for a multi-tenant datacenter with OSI Layer 2 cloud interconnection. Thus, although the instrumentalities described herein are for the convenience of explanation shown and described with respect to exemplary embodiments, it will be understood and appreciated that the principles herein may be applied equally in other types of systems and methods for multi-tenant datacenters.

Figure 1:
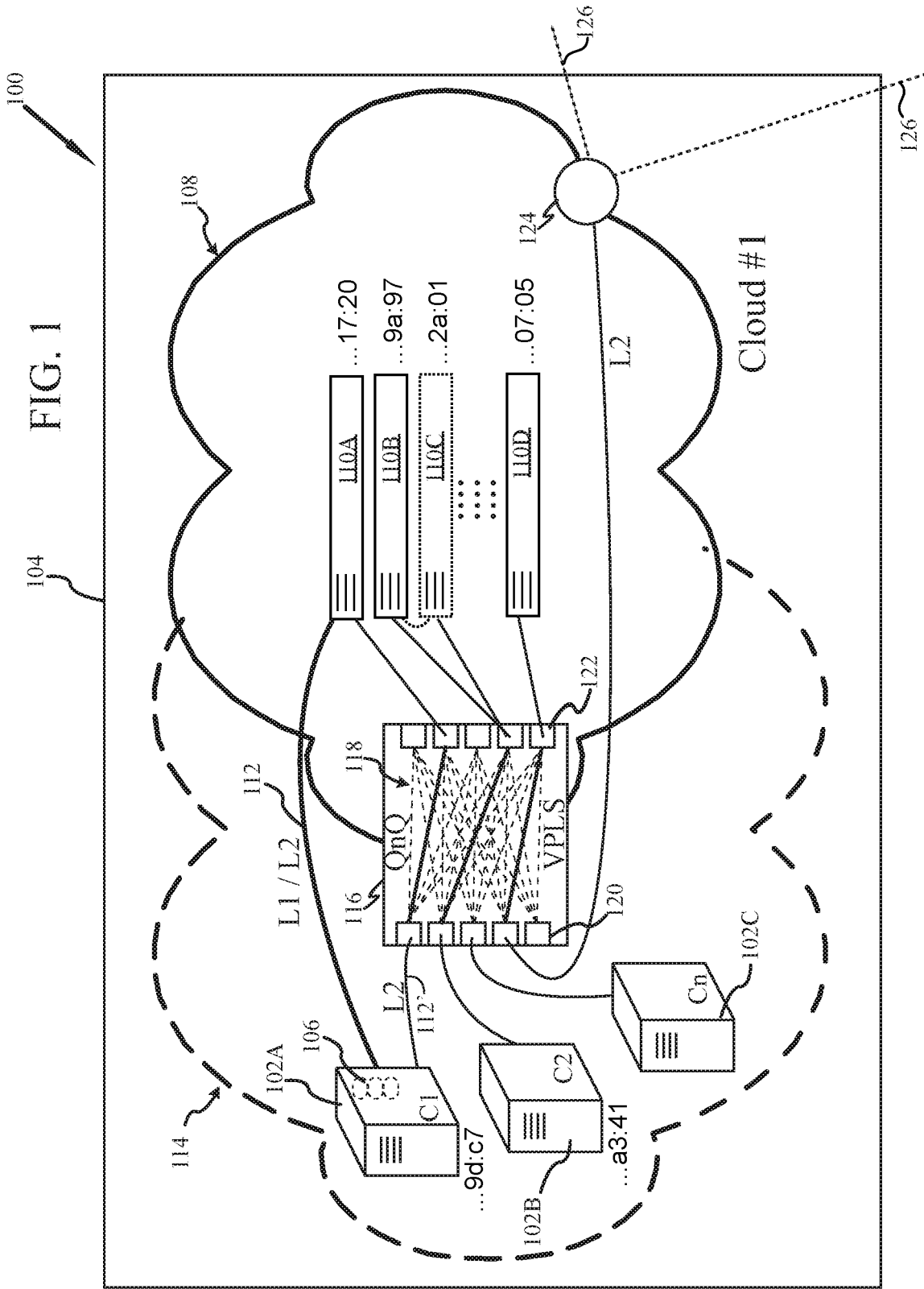
FIG. 1 illustrates a conceptual view of a multi-tenant datacenter with Layer 2 cloud interconnection in accordance with at least one embodiment of the present invention.

Turning now to the drawings, and more specifically FIG. 1, illustrated is a high-level diagram of a multi-tenant datacenter with OSI Layer 2 cloud interconnection ("MTDC") 100 in accordance with certain embodiments.

Moreover, MTDC 100 has a plurality of physical client systems 102, of which client system 102A corresponding to C1, client system 102B corresponding to C2 and client system 102C corresponding to Cn are exemplary. These client systems 102 are located within a first datacenter 104. It is understood and appreciated that although depicted as single elements, each client system 102 may indeed be a racked set of physical components interconnected as a Local Area Network, LAN. Further each client system 102 has a set of physical infrastructure resources 106, such as but not limited to one or more processors, main memory, storage memory, network interface devices, long term storage, network access, etc. . . . It is also understood and appreciated that each client system 102 has an initial client defined network configuration.

A first cloud computing environment, hereinafter first cloud 108 is established in the first datacenter 104 by one or more physical and/or virtual computer systems 110, of which systems 110A-110D are exemplary.

More specifically, first cloud 108 is established at least in part by physical computer systems. Although improvements in manufacturing have reduced the costs associated with physical components and systems, and therefore also reduced the cost of the programmable machine, in many instances the total resources of a machine are not utilized continuously.

In light of this, in many situations it has been found that a physical machine can be adapted to provide a plurality of virtual machines/systems—each an efficient, and functional equivalent of a real physical machine. Each virtual machine/system can provide a complete system platform that supports the execution of a complete operating system and any associated applications.

Because one physical programming machine can support multiple virtual machines/systems, the cost benefits of utilizing virtual machines over individual physical machines can be advantageous. In general, each virtual machine/system is an emulation of a physical machine/system, including a virtualization of the physical components, such as storage devices, network devices, processors and the like. Systems 110A, 110B and 110D are physical systems, and 110C has been shown in dotted outline to indicate that it is a virtual system, provided by physical system 110B.

As used herein the first cloud 108 is understood and appreciated to be a highly scalable and dynamic environment of computer resources and services that can be provided to customers, specifically the client systems 102. In other words the first cloud 108 is structured and arranged to provide Infrastructure as a Service.

Advantageously, the first cloud 108 is coupled to the client systems 102 by OSI Layer 2. As such the first cloud 108 thereby virtually extends the physical infrastructure of the resources of each client system 102. And, as this extension is accomplished at OSI Layer 2, the client systems 102 perceive the extended infrastructure resources as being elements of their network. In other words, each client system 102 advantageously maintains the ability to define and control their own network configuration, such as by software defined networking. This includes extending infrastructure resources in the form of cloud based storage, as will be further discussed below.

It is to be understood and appreciated that the coupling by Layer 2 is truly by Layer 2 and not as a component of a Layer 3 interaction. As noted above and as will be appreciated by those skilled in the art, OSI Layer 2 is the data link layer. At Layer 2, the exchange of data occurs through the transmission of Frames. Although Frames can and are components of Packets which are utilized at OSI Layer 3, the transfer of Frames at Layer 2 occurs without reliance on Packets at Layer 3. Moreover, although Packets and Frames are both packages of data moving through a network, Packets are specifically and fundamentally at OSI Layer 3—the network layer—and by it's very nature is dependent on IP Protocol. The transfer of Frames at Layer 2 can and often is distinct from the transfer of Packets at Layer 3. With respect to the present invention, the coupling at Layer 2 as between the first cloud 108 and the client system 102 is an event prior to an OSI Layer 3 connection. As is further set forth below, as the present invention couples at Layer 2, the present invention permits overlapping VLANS and IP address ranges which is problematic at Layer 3. More simply stated, as the present invention couples at Layer 2 for the transfer of data frames at Layer 2, the present invention advantageously maintains each client system's 102 original network configuration and permits each client system 102 to further define and control their own network configuration.

In other words, the client system 102, generally consisting of a rack of components coupled as a LAN enjoys the resources of the first cloud 108 as if the provided resources were indeed part of the client system's LAN. This is conceptually indicated by dotted extension 114 of cloud computing environment 108.

The coupling of the client systems 102 and the first cloud 108 is achieved through the physical connection of a data channel for the transfer of data frames. This physical connection of a data channel is an OSI Layer 1 interconnection, e.g., wire, fiber, wireless or other appropriate physical data channel.

Figure 6:
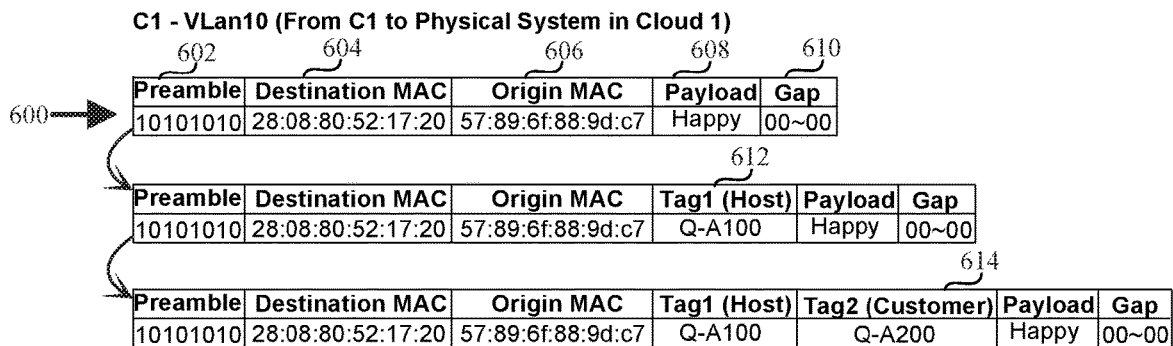
FIG. 6 illustrates an exemplary frame and its Layer 2 tagging for communication between a client system and a cloud system within a common datacenter in accordance with at least one embodiment of the present invention.

The frame is a digital data transmission unit or data packet. In general a frame has control data used to deliver the packet and payload data. At OSI Layer 2, these frames consist of a preamble, a destination Media Access Control address (MAC address), an origin MAC address, zero or more tags, the payload data and a gap. FIG. 6 presents example frame 600, showing preamble 602, a destination MAC address 604 corresponding to system 110A, an origin MAC address 606 corresponding to client system 102A, a payload 608, and a gap 610. These frames as provided by the client systems do not contain the IP address of the destination resource. Similarly, these frames as provided by a first cloud 108 system for return to an associated client system 102 do not contain the IP address of the destination client.

This physical connection permitting OSI Layer 2 interconnection in MTDC 100 between the client systems 102 and the first cloud 108 should not be confused with more traditional cloud environments wherein clients connect to a cloud by way of some data channel but data exchange is knowingly and intentionally handled at OSI Layer 3 or above. Such connections do not seamlessly and transparently blend the client systems 102 and first cloud 108 systems 110 together as is achieved in MTED 100. Moreover, at OSI Layer 3 the transfer of data elements is by Packets, and is dependent upon the IP Protocol. As such the IP address cannot overlap—if they do, then the packet routing system will have a problem in attempting to properly route packets to the correct system and the use of tags at Layer 3 will not resolve the problem. Even if Frames within the Packets are tagged, the fundamental reliance upon IP Protocol at Layer 3 dictates that overlapping IP ranges are still problematic regardless of whether or not some element of frame tagging is attempted. On the other hand, because the present invention utilized Layer 2, and the coupling is prior to an OSI Layer 3 connection, the problematic issues of IP range overlap at Layer 3 are simply not an issue.

With respect to FIG. 1, for at least one embodiment, the client systems 102, such as client system 102A are connected directly to a system 110, as shown by L1/L2 connection link 112, indicating an OSI Layer 1 or OSI Layer 2 link. Although viable, with a large plurality of client systems 102, such direct connection permits limited scalability. Moreover, for at least one alternative embodiment, the client systems 102 are coupled to the first cloud 108 by at least one switch 116. These connections are OSI Layer 2 connections as indicated by the L2 links 112'.

The use of the switch 116 is quite specific and distinct from the use of a router. A router is intended for traditionally interconnecting different networks, e.g., a Level 3 operation. A switch on the other hand is intended to connect computing devices together within one LAN. Each client system 102 is connected to the switch 116 and a map 118 is established within the switch 116 to properly interconnect each client system 102 with the physical or virtual system 110 providing the intended infrastructure resources. For ease of illustration and discussion, this map 118 is conceptually shown as solid and dashed connections as between the ports 120 to which the client systems 102 are connected and the ports 122 to which the physical or virtual systems 110 are connected.

As indicated above, the coupling of the client systems 102 to the first cloud 108 is by the transfer of frames over the physical interconnection. To achieve the transparent extension of the client system 102 infrastructure resources, for at least one embodiment a plurality of OSI Layer 2 tags are employed with each frame. These OSI Layer 2 tags advantageously permit the identification for each client system 102 of a host system and a customer system. Further, these OSI Layer 2 tags are employed transparently by the MTDC 100 such that the client systems 102 advantageously are permitted to operate without need for purposeful transformation or adjustment to their respective LAN environments for participation in the first cloud 108. Again, the use of OSI Layer 2 tags and the transfer of Frames at OSI Layer 2 as distinct from OSI Layer 3 Packets is a distinct and advantageous component of MTDC 100.

In other words, client system 102A may have an IP range set to the rather typical default of 192.168.0.X as may client system 102B. For a traditional cloud computing environment these default IP ranges could pose a problematic issue for with the overlapping ranges proper data intended for a system identified as 192.168.0.50 as part of client system 102A could be inadvertently provided to a system identified as 192.168.0.50 as part of client system 102B.

Likewise if multiple clients established Virtual local area networks, or VLANs, as default settings are often maintained, and or random selection could still permit overlapping ranges, errors in network traffic management could occur. As MTDC 100 advantageously employs OSI Layer 2 tagging and is not reliant upon IP addresses, these issues are irrelevant and each client system 102 is permitted to operate without interference.

For at least one embodiment, the OSI Layer 2 tags employed are Q tags as defined by IEEE 802.1Q. As the MTDC 100 is employing OSI Layer 2 tags to at least identify a host and customer, two (2) Q tags are generally employed at a minimum, known as QinQ tagging. More specifically, IEEE 802.1Q is understood and appreciated as a standard for VLAN tagging. With IEEE standard 802.1ad, double-tagging can be achieved which permits mixing traffic from multiple client systems 102 that have already been tagged.

To permit the QinQ tagging, in at least one embodiment of MTDC 100, two switches 116 may be connected in series to permit the double tagging. For at least one alternative embodiment, an enhanced switch 116 is employed that is structured and arranged to permit double Q tagging. With respect to MTDC 100 as shown in FIG. 1, when a frame enters a port, e.g., ports 120 from the client systems 102 or ports 122 from the first cloud 108 systems 110, a tag is added to represent the VLAN membership of the frame's port and the second tag is added to represent the VLAN membership of the frame's destination port.

With respect to the exemplary frame 600 shown in FIG. 6, for the sake of example "A" series tags have been adopted to identify frames for association to client system 102A. As such, Tag 1—the host tag 612—is shown as Q-A100 and Tag2—the customer tag 614—is shown as Q-A200.

Moreover, for at least one embodiment, an element of the OSI Layer 2 coupling of the client systems 102 to the first cloud 108 is the mapping of the OSI Layer 2 tags such that switch 116 properly interconnects the client systems 102 with the cloud 108, and more specifically the systems 110 within the first cloud providing the extended infrastructure. For at least one embodiment, the mapping process includes defining for each client system 102 the host and customer tags, and may well include defining additional tags which may be used, but are not limited to, identification of the datacenter 104, i.e. cloud 108, itself to permit proper interconnection of multiple instances MTDC 100. The tagging process is further discussed below in in connection with describing at least one method for providing MTDC 100.

In at least one embodiment additional OSI Layer 2 tags are also employed, such as VPLS, MPLS tags, Segment ID Layer 2 tags and or Global VLAN Layer 2 tags. Moreover, in varying embodiments, the OSI Layer 2 tags employed are selected from the group consisting of QinQ tags, MPLS tags, VPLS tags, Segment ID tags, Global VLAN tags and combinations thereof. The use of multiple OSI Layer 2 tags can permit increased scalability as well as the ability to interconnect multiple MTDC 100 locations advantageously at OSI Layer 2. Indeed, an additional switch 124 is shown with a OSI Layer 2 connection to switch 116. Switch 124 is structured and arranged to permit interconnection of this first instance of MTDC 100 with one or more second instances of MTDC 100 as suggested by dotted interconnection lines 126 and as further described below with respect to FIG. 2.

Moreover, the use of Layer 2 tags selected from the group consisting of, but not limited to, Q tags, QinQ tags, MPLS tags, VPLS tags, are to be understood and appreciated as options for one or more specific embodiments, and not as limitations. Indeed other current and developing protocols that permit Layer 2 extension are understood and appreciated to fall within the present teachings for a multi-tenant datacenter with OSI Layer 2 could interconnection.

To summarize, for at least one embodiment the MTDC 100 consists of a plurality of physical client systems 102 in a first datacenter 104, each physical client system 102 having a set of physical infrastructure resources 106. A first cloud 108 is also established in the first datacenter 104. The first cloud 108 is coupled to the physical client systems 102 by OSI Layer 2, the first cloud 108 thereby virtually extending the physical infrastructure resources 106 of each physical client system 102.

In addition, for at least one embodiment the MTDC 100 consists of a plurality of physical client systems 102 in a first datacenter 104, each physical client system 102 having a set of physical infrastructure resources 106. A first cloud 108 is also established in the first datacenter 104. The first cloud 108 is coupled to the physical client systems 102 by OSI Layer 2 as the physical connection of a data channel for the transfer of data frames distinct from OSI Layer 3 communications, the first cloud 108 thereby virtually extending the physical infrastructure resources 106 of each physical client system 102.

Further, for at least one embodiment the MTDC 100 consists of a plurality of physical client systems 102 in a first datacenter 104, each physical client system 102 having a set of physical infrastructure resources 106. A first cloud 108 is also established in the first datacenter 104. The first cloud 108 is coupled to the physical client systems 102 by OSI Layer 2, prior to an OSI Layer 3 connection, as the physical connection of a data channel for the transfer of data frames, each frame having a plurality of OSI Layer 2 tags permitting at least two client systems to have overlapping VLANs and or overlapping IP address ranges, the first cloud 108 thereby virtually extending the physical infrastructure resources 106 of each physical client system 102.

Figure 2:
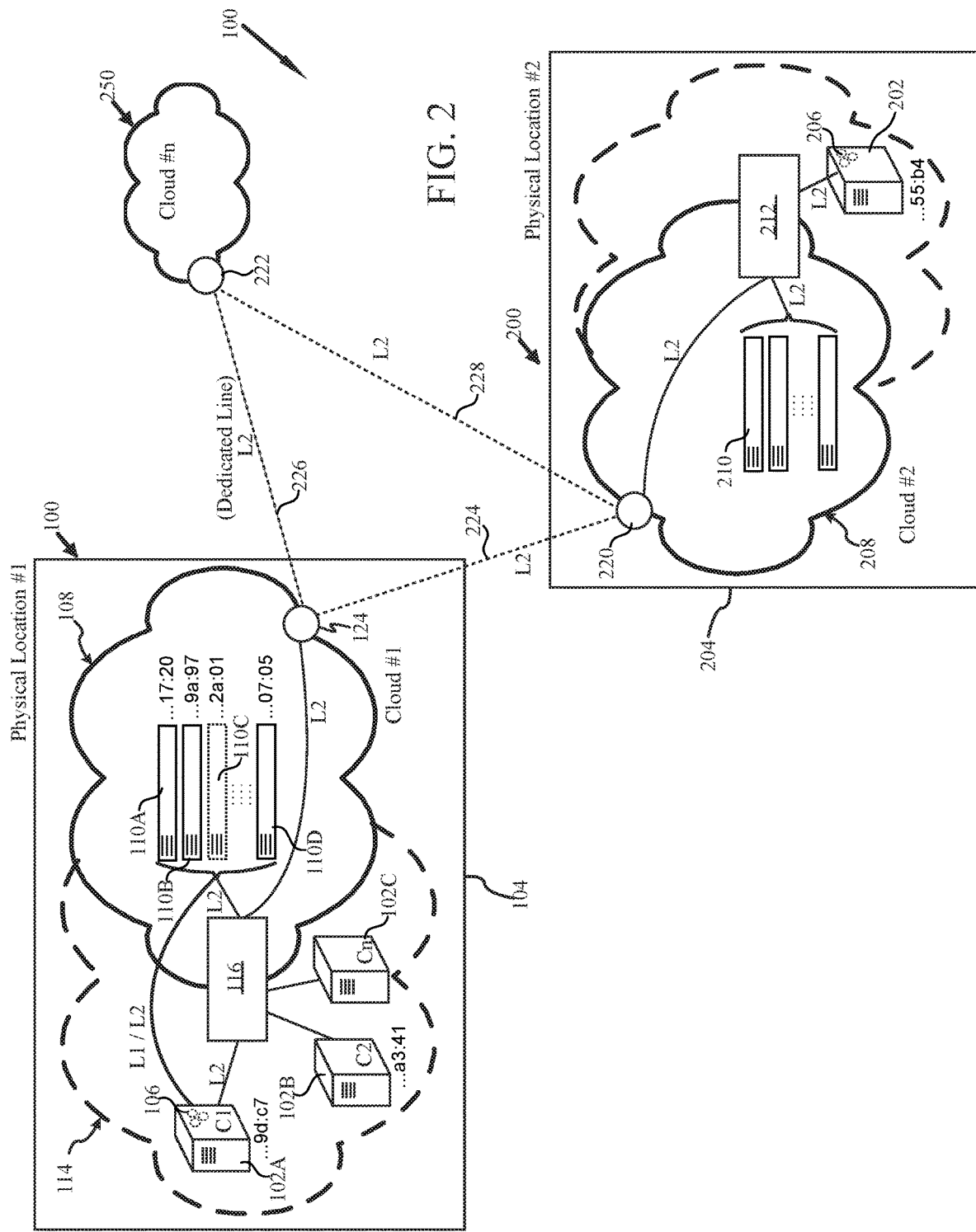
FIG. 2 illustrates a conceptual view of multiple multi-tenant datacenter with Layer 2 cloud interconnection interconnected in accordance with at least one embodiment of the present invention.

FIG. 2 conceptually illustrates a further embodiment of the present invention wherein multiple MTDC 100 installations are interconnected. More specifically, in FIG. 2, MTDC 100 is generally shown reproduced at a smaller scale.

An additional installation of multi-tenant datacenters with OSI Layer 2 interconnection is shown as MTDC 200 having a second cloud computing environment, hereinafter second cloud 208 in a second datacenter 204, also housing at least one client system 202. The second cloud 208 is established in the second datacenter 204 by one or more physical and/or virtual computer systems 210. Moreover, with respect to this description it is understood and appreciated that MTDC 100 refers generally to the single multi-tenant datacenter as shown in FIG. 1, however MTDC 100 may also refer to embodiments having multiple distinct datacenters that are interconnected. To the extent possible distinct references, such as MTDC 200 and MTDC 250 are used to help distinguish between specific instances, but in the absence of such distinction a general reference to MTDC 100 may be applied to the collective whole of interconnected datacenters.

As with the client systems 102 of MTDC 100, each client system 202 of MTDC 200 has a set of physical infrastructure resources 206. As the client system 202 is coupled to the second cloud 208 by OSI Layer 2, the second cloud 208 virtually extends the physical infrastructure resources of each physical client 202. For at least one embodiment the coupling of the client systems 202 to the second cloud 208 is performed with a switch 212.

A third instance of a multi-tenant datacenter with OSI Layer 2 interconnection is also shown as MTDC 250, and for ease of illustration and discussion is conceptually shown as a cloud. It is understood and appreciated that MTDC 250 comprises substantially the same components and elements of configuration as shown and described with respect to MTDC 100 and MTDC 200. Additional instances of MTDC may of course also be provided but are not shown for ease of illustration and discussion. As with the use of OSI Layer 2 tags to uniquely identify the interconnections of client systems 102 and the first cloud 108, OSI Layer 2 tags are used to uniquely identify each cloud, e.g., first cloud 108, second cloud 208, and the cloud of MTDC 250, not shown. Moreover, in at least one embodiment each datacenter, i.e., cloud has it's own pre-defined OSI Layer 2 tag or range or OSI Layer 2 tags, these tags provided in the map established with each switch, e.g., switch 116, 212 in each MTDC, e.g., MDTC 100, 200.

With respect to FIG. 2, MTDC 100, MTDC 200 and MTDC 250 are shown as being interconnected by switches 124, 220 and 222 which permit OSI Layer 2 interconnection over dedicated lines 224, 226 and 228. OSI Layer 2 interconnection of MTDCs is advantageous as each cloud, e.g., first cloud 108 and second cloud 208 of each interconnected MTDC is indistinguishable by the plurality of client systems 102, 202.

Moreover, the infrastructure resources of the first cloud 108 can be utilized by clients systems 204 in the second datacenter 204 as if they were part of the first cloud, and vis-a-versa. Indeed the addition of additional MTDCs such as MTDC 250 advantageously provides further infrastructure resources to the overall interconnected cloud environment.

In short the cloud environment itself is advantageously dynamically adjustable as the OSI Layer 2 interconnections between the various physical datacenters permit the entire cloud environment to be structured and arranged as a collective whole. Such dynamic adjustment may advantageously provide greater efficiency in response time to changing client system demands, upgrades and overall system maintenance, as well as overall transparent reassignment of infrastructure resources as well as other benefits.

Figure 3:
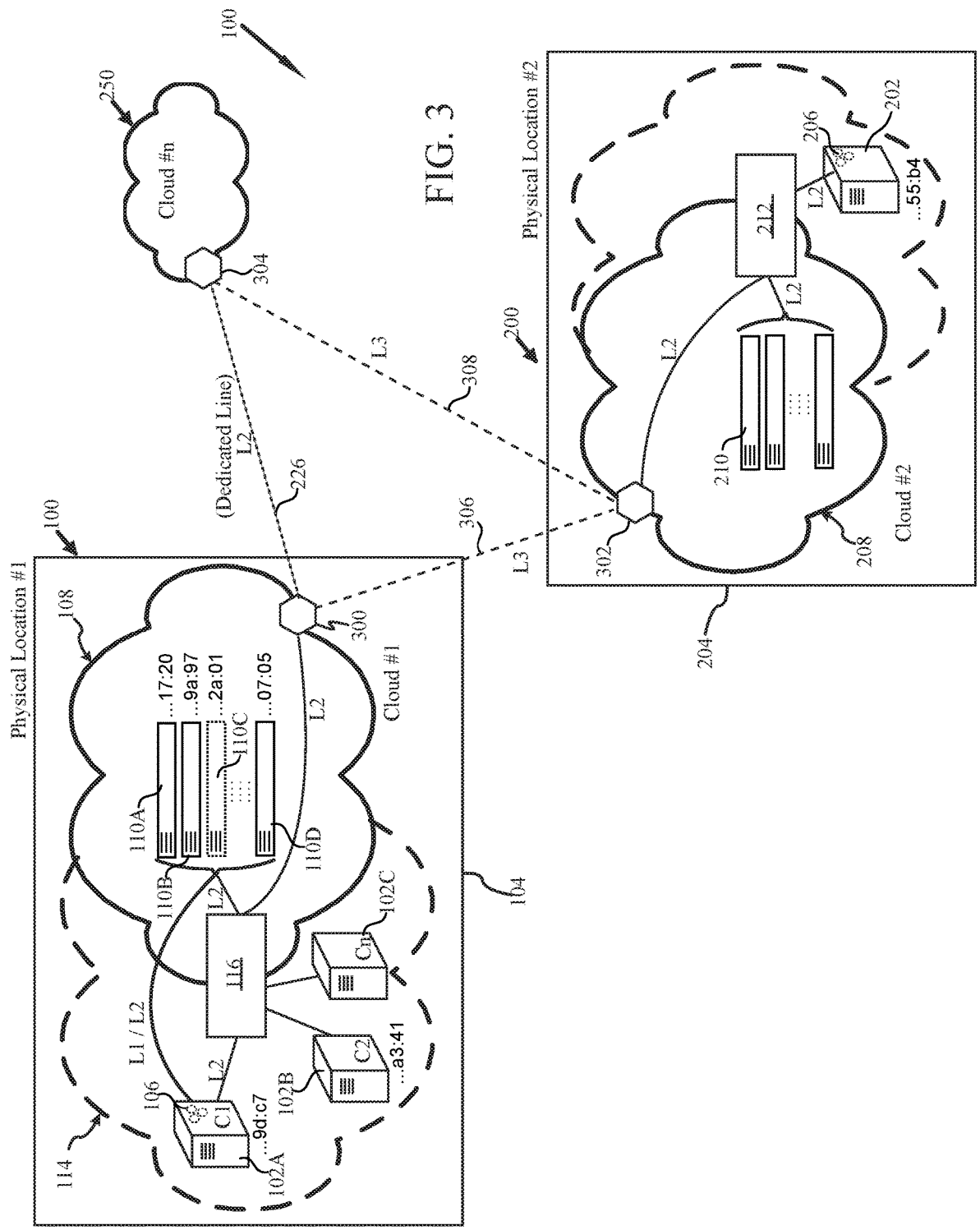
FIG. 3 illustrates yet another conceptual view of multiple multi-tenant datacenter with Layer 2 cloud interconnection interconnected in accordance with at least one embodiment of the present invention.

In some embodiments due to cost constraints or other factors it may be desirable to use existing network providers to link one or more MTDCs. Such a configuration is shown in FIG. 3, where switches 124, 220 and 222 have been replaced by routers 300, 302 and 304. As shown, dedicated link 226 is still provided between MTDC 100 and MTDC 250, however network provider link 306 operating at ISO Layer 3 is in place between MTDC 100 and MTDC 200. Likewise network provider link 308 operating at ISO Layer 3 is in place between MTDC 250 and MTDC 200.

The introduction of a network provider links 306 and 308 as a means for interconnection between MTCDs is substantially immaterial. The client systems, e.g., clients 102 and 202 are not aware of the network provider links 306 and 308. More specifically, the client systems 102 and 202 are permitted to continue operation and use of the interconnected cloud resources as part of their own respective LANs. Although an IP address may be added to the frame, the addition is performed by the outbound router, e.g., router 300 and removed upon receipt by the inbound router, e.g., router 302—the addition and removal being transparently performed from the perspective of the client systems 102, 202 and the respective systems 110, 210 virtually extending the infrastructure resources.

In general, where multiple clients share space and facility resources the costs per client are generally reduced from what would otherwise be required in the support of a single client. As such, for clients with investments in physical computer resources integration of those resources into MTDC 100 advantageously permits dynamic adaptation of infrastructure as a service in a multi-tenant environment that is not otherwise available.

It is also understood and appreciated that the features and benefits of MTDC 100 alone or interconnected with other MTDCs, e.g., MTDC 200 are not limited to physical client systems 102. For at least one embodiment of MTDC 100, an entirely virtualized client system is established within MTDC 100. For such an embodiment, the virtualized client system enjoys substantially the same advantages of dynamic scalability, permitted overlapping IP ranges, permitted overlapping VLANs and other benefits provided to the physical client systems 102. Should one or more virtual client systems be established in an embodiment consisting of multiple interconnected MTDCs, e.g., at least MTDC 100 and 200 the advantages provided to the virtualized client system are further extended as with the physical client systems 102 and 202.

Figure 4:
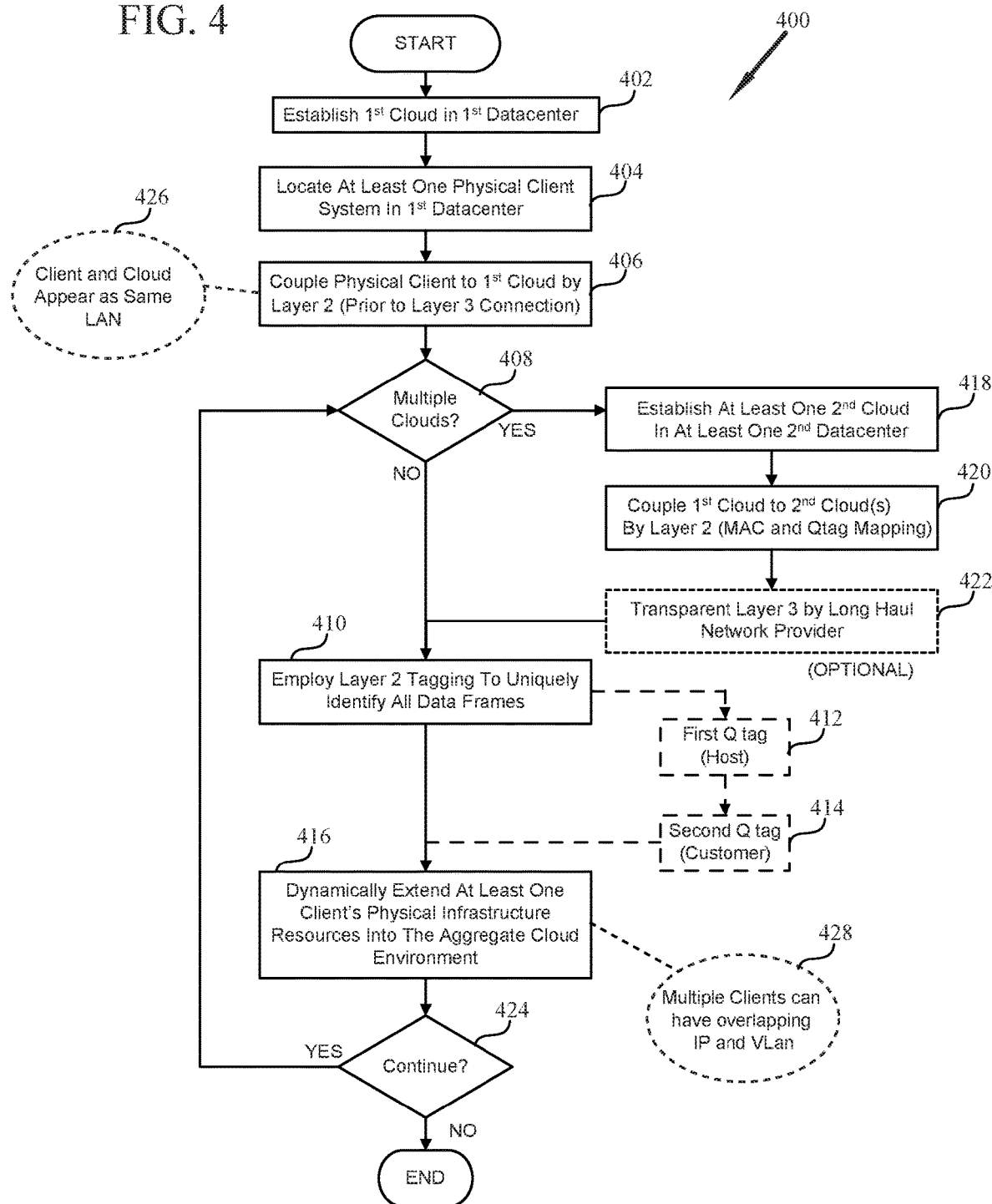
FIG. 4 illustrates a high level flow diagram depicting at least one method for a multi-tenant datacenter in accordance with at least one embodiment of the present invention.
Figure 5:
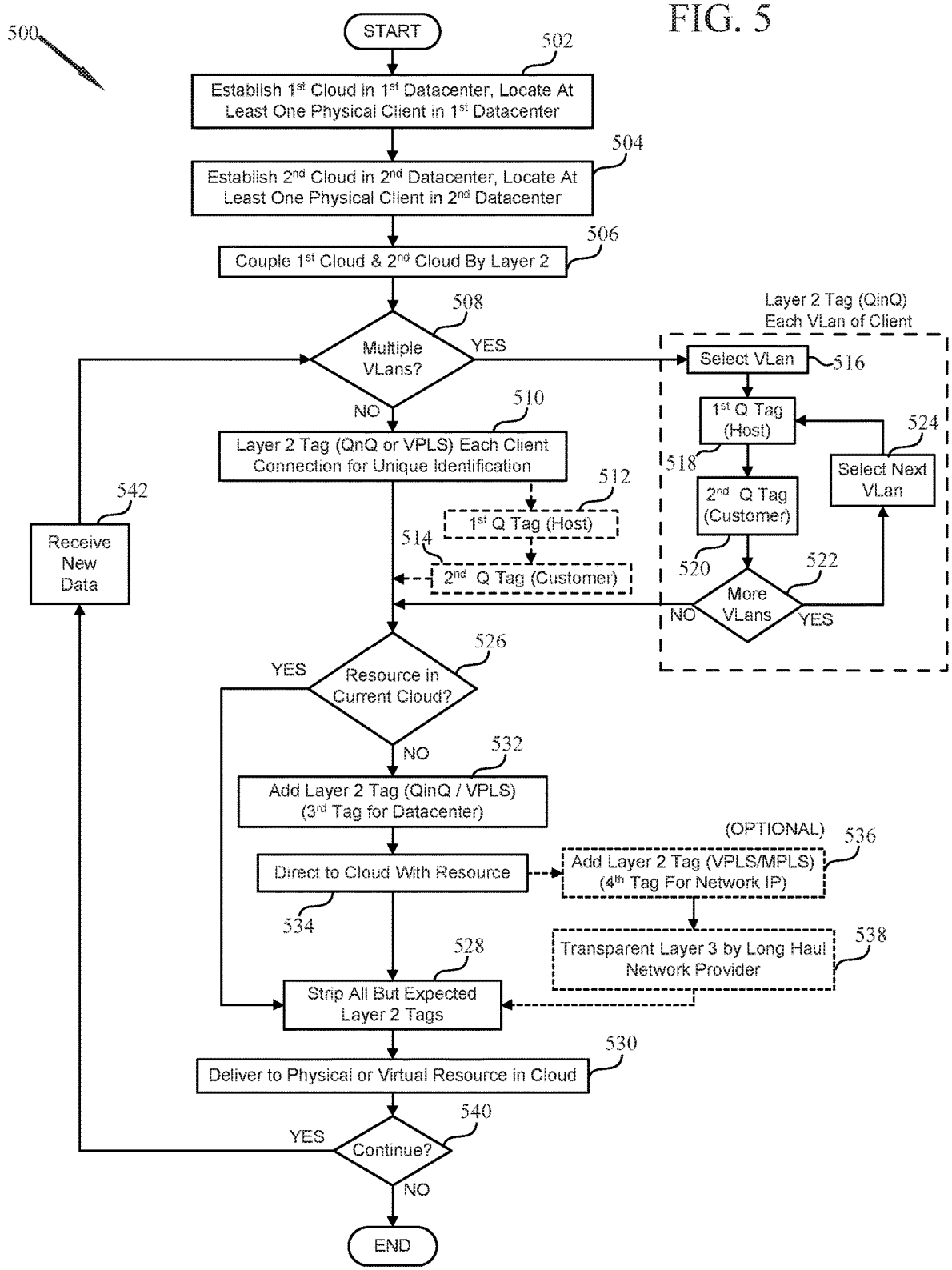
FIG. 5 is illustrates a more refined flow diagram depicting at least one method for a multi-tenant datacenter in accordance with at least one embodiment of the present invention.

FIG. 4 conceptually illustrates a high level flow diagram depicting at least one method 400 for a multi-tenant datacenter, e.g., MTDC 100, and FIG. 5 conceptually illustrates a more refined method 500 for a multi-tenant datacenter, e.g., MTDC 100 or interconnected plurality of MTDCs. It will be understood and appreciated that the described methods need not be performed in the order in which it is herein described, but that this description is merely exemplary of one method for providing MTDC 100.

At a high level, method 400 may be summarized and understood as follows. For the illustrated example, method 400 commences with establishing a first cloud 108 in a first datacenter 104, block 402 and see FIG. 1. At least one physical client system 102 is then also located within the first datacenter 108, block 404. As shown and described above with respect to FIG. 1, each physical client system 102 has a set of physical infrastructure resources 106.

The physical client 102 and first cloud 108 are then coupled by OSI Layer 2, block 406. As shown in comparison of FIG. 1 to FIGS. 2 and 3, there can be one instance of MTDC 100 or a plurality of them interconnected. Method 400 addresses this possibility with decision 408. For a first embodiment consisting of a single instance of MTDC 100 (Multiple Clouds=No), method 400 moves to employing OSI Layer 2 tagging to uniquely identify all data frames, block 410.

For at least one embodiment, the OSI Layer 2 tagging is QinQ tagging, with the first Q tag identifying the host, block 412, and the second Q tag identifying the customer, block 414. In varying alternative embodiments additional OSI Layer 2 tags may also be employed such as for example VPLS and MPLS tags. Again, as noted above, the use of Q tags, QinQ tags, MPLS tags, VPLS tags, Segment ID tags, Global VLAN tags and combinations thereof are exemplary of Layer 2 tags permitting Layer 2 extension, and are not exclusive limitations.

Moreover, the use of Layer 2 tags selected from the group consisting of, but not limited to, Q tags, QinQ tags, MPLS tags, VPLS tags, Segment ID tags, Global VLAN tags are to be understood and appreciated as options for one or more specific embodiments, and not as limitations. Indeed other current and developing protocols that permit Layer 2 extension are understood and appreciated to fall within the present teachings for Layer 2 tagging to uniquely identify all data frames.

The OSI Layer 2 tagging permits the dynamic extension of at least one physical client system's physical infrastructure resources into the cloud computing environment, block 416. For at least one embodiment, at least one of these infrastructure resources is storage. Again, it is the coupling at OSI Layer 2 as opposed to the more common OSI Layer 3 and the distinct use of Layer 2 frames apart packets at OSI Layer 3 which advantageously permit the present invention to achieve this dynamic extension of at least one physical client system's physical infrastructure resources, including the potential overlap of IP address rages and or overlapping VLANS. Network interconnection performed at OSI Layer 3 and reliant upon OSI Layer 3 can not achieve these advantages.

With respect to decision 408 and the evaluation of multiple clouds, for at least a second embodiment consisting of multiple instances of MTDC, e.g., at least MTDC 100 and MTDC 200 (Multiple Clouds=Yes), method 400 moves to establishing at least one second cloud 208 in at least one second datacenter 204, block 418 and see FIG. 2.

As noted above, the first cloud 108 is coupled to the second cloud 208 by OSI Layer 2, block 420. Moreover, the methodology of mapping MAC addresses and Q tags as employed for the OSI Layer 2 coupling of client systems 102 to the first cloud 108 is extrapolated and applied to couple the first cloud 108 and the second cloud 208. As shown in FIG. 2, for at least one embodiment this cloud to cloud coupling of multiple MTDCs is entirely OSI Layer 2.

However, for at least one optional environment as shown in FIG. 3 long haul network provider links may be employed. For such an embodiment, transparent Layer 3 transformation is performed merely for the long haul component of connection between physical datacenters, block 422. The Layer 3 and IP component is not apparent to the client systems or the cloud supporting systems. With the resources virtually extended as indicated by block 416, method 400 continues as long as desired, decision 424.

Moreover, coupling the client systems 102 to the first cloud 108, as indicated by block 406 permits the clients and their associated cloud resources to appear as being on the same LAN, dotted oval 426. In addition, the OSI Layer 2 tagging, such as provided by the QinQ tagging of blocks 412 and 414 for the dynamic extension of the client resources into the cloud as in block 416 advantageously permits multiple clients to have overlapping IP and or VLAN settings without interference, dotted oval 428.

To summarize, for at least one embodiment a method 400 of providing MTDC 100 consists of establishing within a first datacenter 104 a first cloud 108. At least one physical client system 102 is also located within the first datacenter 104, each physical client system 102 having a set of physical infrastructure resources 106. The method 400 continues by coupling the at least one physical client system 102 to the first cloud 108 by OSI Layer 2, the OSI Layer 2 coupling thereby virtually extending the physical infrastructure resources 106 of each physical client system 102.

An embodiment of a method 400 for providing MTDC 100 may also be summarized as establishing within a first datacenter 104 a first cloud 108, and locating a plurality of physical client systems 102 in the first datacenter 108, each physical client system 102 having a set of physical infrastructure resources. The method continues by uniquely identifying data traffic as between each client system 102 and the first cloud 108 by a plurality of OSI Layer 2 tags permitting unique identification for each client system 102 of at least one host and a customer.

FIG. 5 conceptually illustrates a more refined method 500 for a multi-tenant datacenter further illustrating the use of additional OSI Layer 2 tags with respect to resources in different cloud computing environments 108.

Method 500 commences with establishing a first cloud 108 in a first datacenter 104, locating at least one physical client system 102 within the first datacenter 104 and coupling the client system 102 to the first cloud 108, block 502.

Next, a second cloud 208 in a second datacenter 204 is established, at least one physical client system 202 is located within the second datacenter 204 and the client system 202 and second cloud 208 are coupled, block 504. MTDC 100 and MTDC 200 are then coupled, block 506.

For the example method 500, next is a query to determine if a client system has multiple VLANs, decision 508. If the answer is NO, the method 500 proceeds to apply OSI Layer 2 tags for each client connection for unique identification of all data frames, block 510. For at least one embodiment, the OSI Layer 2 tagging is QinQ tagging, with the first Q tag identifying the host, block 512, and the second Q tag identifying the customer, block 514. In varying alternative embodiments additional or alternative OSI Layer 2 tags may be employed, such as for example VPLS and MPLS tags.

Where indeed there are multiple VLANs, an answer of Yes for decision 508, the method 500 proceeds to apply Level 2 tags to uniquely identify each VLAN for each client system 102. For at least one embodiment this OSI Layer 2 tagging is QinQ tagging. Moreover, method 500 proceeds to select a VLAN, block 516, apply the first Q tag identifying the host, block 518 and the second Q tag identifying the customer, block 520. If there are more VLANs remaining, decision 522, the next VLAN is selected, block 524 and the process repeats until all VLANs have been uniquely tagged.

For proper delivery of the frame, the map of the pre-defined OSI Layer 2 tags is consulted to determine the location of the resource. With respect to FIG. 1 and the above description, it is understood and appreciated that the map is an element of switch 116. With respect to the multi MTDC configuration shown in FIGS. 2 and 3, each MTDC instance has a switch, e.g., switch 212 of MTDC 200, which also a map table for the pre-defined OSI Layer 2 tags.

As noted above, for at least one specific embodiment, at least one type of infrastructure that is extended for client systems is storage.

Figure 10:
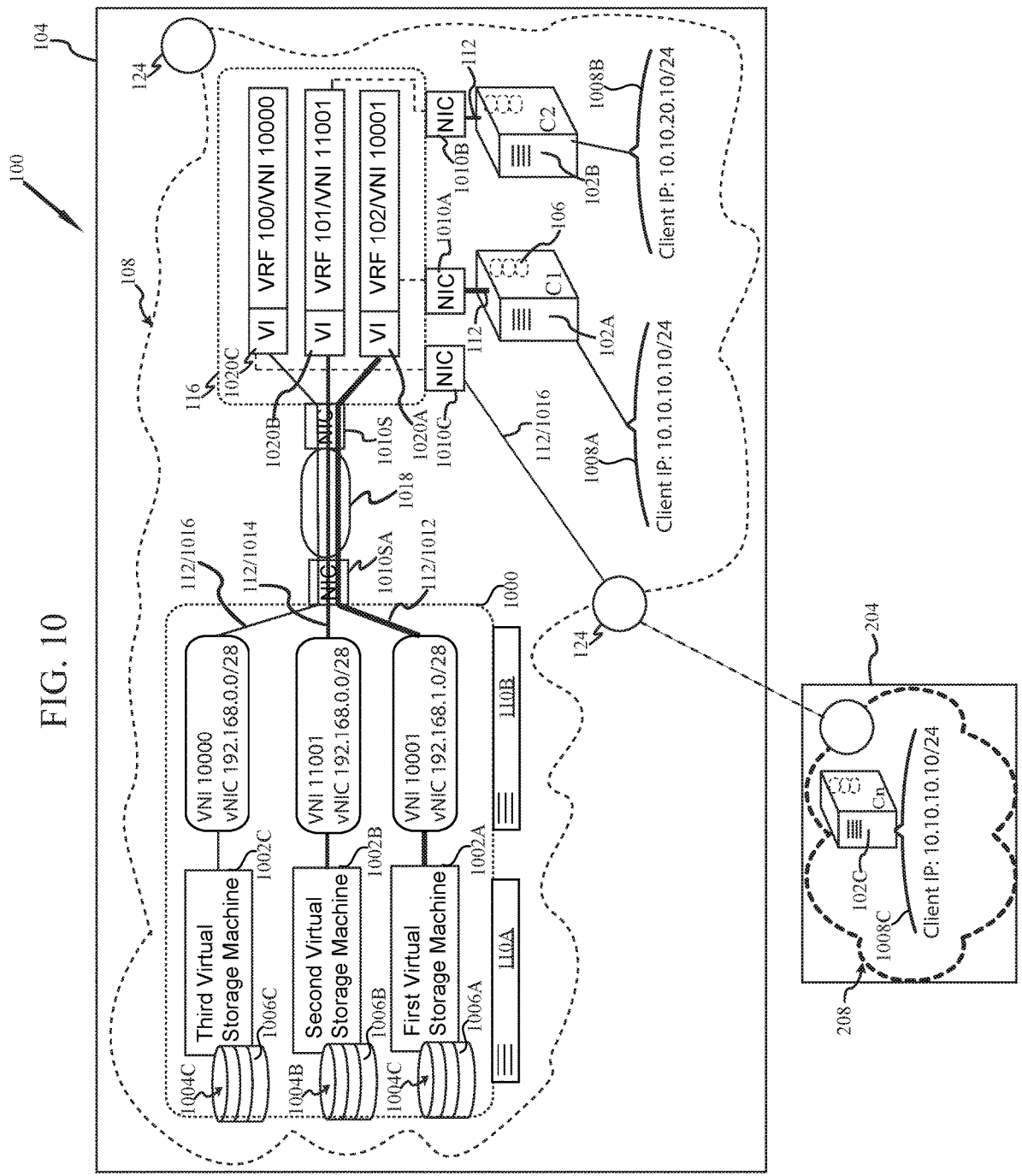
FIG. 10 illustrates a conceptual view of a multi-tenant datacenter with Layer 2 cloud interconnection providing cloud storage in accordance with at least one embodiment of the present invention.

To further appreciate the nature of such an embodiment, the details of FIG. 1 may be refined as shown in FIG. 10, wherein the Storage Array 1000 is provided by a one or more physical and/or virtual systems 110 (showing 110A and 110B for example), adapted to provide at least one Virtual Storage Machine (SVM) 1002, such as First VSM 1002A, Second SVM 1002B and third VSM 1002C, each adapted to provide storage resources 1004. For at least one embodiment, these storage resources 1004 are presented as Storage Volumes (SV) 1006.

As with FIG. 1, FIG. 10 illustrates Client Systems (CS) 102, and more specifically Client Systems 102A, 102B and 102C each having a set of infrastructure resources 106 and an initial networking configuration 1008. For purposes of discussion, Client Systems 102A and 102B are illustrated as disposed within the physical structure of first datacenter 104, and Client System 102C is shown as remote—coupling to the first cloud 108 environment within first datacenter 104 by way of a networking device 124, such as switch 124.

Switch 116 of FIG. 1, is further refined to illustrate a plurality of physical or virtual Network Interface Cards (NICs) 1010 permitting the exemplary Client Systems (CS) 102A, 102B, 102C, to connect and at least one Storage Volume (SV) 1006 provided by at least one Virtual Storage Machine (VSM) 1002. Of course, physical storage machines (not shown) may also be used in optional embodiments. It is further understood and appreciated that in varying embodiments the switch 116 may be a physical or virtual device.

For the exemplary embodiment conceptualized in FIG. 10, Virtual Storage Machines (VSMs) 1002 provide a plurality of Storage Volumes (SVs) 1006. A Client System (CS) 102 desiring expanded storage, such as CS 102A, may achieve such expansion of storage infrastructure resources by connecting to a First Virtual Storage Machine (FVSM) 1002A. This First Virtual Storage Machine (FVSM) 1002A couples to Client System (CS) 102A as shown in FIG. 10 by switch 116. In other embodiments Client Systems (CS) 102 may access storage resources by directly accessing Storage Array 1000 without the use of Virtual Storage Machines.

In greater detail, this coupling is further illustrated in FIG. 10 by showing First Virtual Storage Machine (FVSM) 1002A and Client System (CS) 102A coupled by a thick dark line 1012. Correspondingly, the second Client System (SC) 102B is coupled by a medium weight line 1014 to Second Virtual Storage Machine (SVSM) 1002B and the third Client System (SC) 102C is coupled by a light weight line 1016 to Third Virtual Storage Machine (TVSM) 1002C.

For at least one embodiment, each Client System 102 is coupled to at least one Virtual Storage Machine 1002—such as for primary and backup storage, with each coupled Virtual Storage Machine specifically dedicated to it's Client System 102. Such a model has been used for ease of illustration and discussion in FIGS. 10 and 11. For yet another embodiment, at least one Virtual Storage Machine 1002 is configured to couple to multiple Client Systems 102, the segregation of data stored maintained and achieved based at least in part on the OSI Layer 2 tags. Moreover, First Virtual Storage Machine (FVSM) 1002 may provide a first Storage Volume (SV) 1006A for Client System 102A, and may provide a second Storage Volume (SV) for yet another Client System 102.

It is also understood and appreciated that the Storage Volumes (SV) 1006 may be provided in a variety of different formats so as to transparently extend the storage resources of coupled Client Systems 102. Moreover, in varying embodiments, a Virtual Storage Machines (VSM) 1002 may be adapted to provide one or more Storage Volumes that may be compatible with the use of a file system selected from the group consisting of, but not exclusively limited to, ("File Allocation Table") FAT(FAT12, FAT 16, FAT 36), exFAT, ("New Technology File System") NTFS, ("Hierarchical File System") HFS, HFS+, ("High Performance File System") HPFS, ("Apple File System") APFS, ("Unix File System") UFX, ("Second Extended File System") ext2, ext3, ext4, XFS, BTRFS, ISO 9660, Files-11, VMFS, or other such file system. Further, in varying embodiments, a Virtual Storage Machine (VSM) 1002 may provide Storage Volumes (SV) 1006 of the same file system structure, or Storage Volumes (SV) 1006 of different file system structures.

Returning to the specific example of Client Systems and their relative connections to the Storage Array 1000, for simplicity of discussion the first path of traffic is from the Client System 102 to the Storage Array 1000. The second path of traffic, or return path, is from the Storage Array 1000 to the Client System 102.

This first path of data traffic occurs with Client System (CS) 102A coupled with First Virtual Storage Machine (FVSM) 1002A, Client System (CS) 102A is directing traffic thorough NIC or VNIC 1010A associated with switch 116 which associates that data with VRF 102 (Virtual Routing and Forwarding Table) through a means of identification such as ingress on NIC 1010A, that the traffic was received on, and associates VRF 102 with VNI10001 for further transmission on the network. This may be viewed as encapsulation.

VRF102 may now direct the traffic originating from Client System (CS) 102A through NIC 1010S for transmission to Storage Array 1000 across pathway 1018, being received by NIC 1010SA. Advantageously, this data transfer may be further encapsulated between Switch 116 and Storage Array 1000 as a VLAN, e.g. VLAN 100.

Although lines 1012, 1014 and 1016 have been illustrated distinctly for ease of illustration and discussion, it is specifically understood that the coupling of one or more Client Systems 102 to one or more of the Virtual Storage Machines (VSMs) 1002 of the Storage Array 1000 may occur over a single pathway 1018, and more specifically a single hardware pathway. Moreover, whether the Client Systems 102 and the Storage Array 1000 are proximate to each other or remote as shown and discussed with respect to FIG. 11 below, the one or more pathways 1018 between switch 116 and Storage Array 1000, and more specifically the Virtual Storage Machines (VSMs) 1002, transfer data often in a co-mingled state. As noted herein, it is the advantageous use of OSI Layer 2 tagging that permits the advantageous transparent segregation of this data traffic and extension of infrastructure resources to occur.

Moreover, in some embodiments pathway 1018 may not be exclusively used by switch 116 and storage 1000. It is therefore to be understood and appreciated that in some network topologies where other devices may utilize pathway 1018 for communication, VLAN 100 may be used for segregation of traffic at Layer 2 on pathway 1018 without affecting the segmentation provided by the plurality of Layer 2 tags applied to the traffic from Client Systems (CS) 102 by Switch 116.

For the return path of data, the First Virtual Storage Machine 1002A is directing traffic, associated with VNI10001 from itself or through a NIC or VNIC 1010SA associated with the Storage Array 1000 to switch 116 across pathway 1018 to NIC or VNIC 1010S, for the de-encapsulation and association with the corresponding Virtual Interface (VI) 1020, of which corresponding VI 1020A, 1020B, and 1020C are shown for each illustrated Client System 102A, 102B and 102C. Virtual Routing and Forwarding table (VRF) associated with Client System (CS) 102A is shown as VRF 102 and Virtual Network Interface (VNI) as 10001.

With respect to the present example, virtualized elements, such as Virtual Storage Machines (VSMs) 1002 and Virtual Network Interface Cards (VNICs) are understood and appreciated to be highly adaptable, implemented and removed at increase speed and without physical costs traditionally associated with hardware components. Indeed, although hardware components support virtual components, more virtual components are traditionally implemented in embodiments of MTDC 100 then could be physically provided.

Although a single NIC has been illustrated, it is understood and appreciated that in varying embodiments additional NICs, VNICs or combinations thereof may be implemented and are understood and appreciated to fall under the spirit of the present invention as described. In addition, the Virtual Interface 1020 is a logical construct encapsulating an OSI Layer 2 and possibly OSI Layer 3 configuration that is associated with at least one NIC or VNIC for conveyance of network traffic. For clarification, it should be noted and understood that the segregation of traffic for the plurality of Client Systems 102 is achieved by use of OSI Layer 2 tags. The use and implementation of VRFs and the Virtual Interface 1020 builds on top of the underlying OSI Layer 2 segregation achieved by MTDC 100.

Data traffic pathways for Client System (CS) 102B and Client System (CS) 102C have also been conceptually illustrated in FIG. 10, each substantially mirroring the pathways shown and described for Client System (CS) 102A, with Client System (CS) 102B having Virtual Routing and Forwarding (VRF) as 101 and VXLAN Network Identifier (VNI) as 11001, and Client System (CS) 102C having Virtual Routing and Forwarding (VRF) as 100 and VXLAN Network Identifier (VNI) as 10000.

Distinct for each Client System (CS) 102, these network configurations 1008 present elements of overlap, but are uniquely identified for segregation based on OSI Layer 2 tags as described above and as implemented by Switch 116.

To summarize, for at least one embodiment, the MTDC 100 providing cloud storage for Client Systems (CS) 102 utilizing OSI Layer 2 tags to segregate transmission data between Client Systems (CS) 102 and the MTDC 100 providing cloud storage may be summarized as: a plurality of Client Systems (CS) 102 coupled to a first datacenter 104 each Client System (CS) 102 having a set of infrastructure resources 106 and an initial networking configuration 1008; and a first cloud computing environment 108 established in the first datacenter 104, and coupled to the Client Systems (CS) 102 by OSI Layer 2 as a data link layer for the transfer of data frames, each frame having a plurality of OSI Layer 2 tags, the first cloud computing environment 108 providing storage resources 1004 for allocation to at least two Client Systems (CS) 102, the plurality of OSI Layer 2 tags permitting the at least two Client Systems (CS) 102 to have overlapping network configurations 1010.

Further, for at least one embodiment, the operation of MTDC 100 may be summarized as a method for providing a cloud storage MTDC 100, utilizing OSI Layer 2 tags to segregate transmission data between Client Systems (CS) 102, comprising: establishing within a first datacenter 104 a first cloud computing environment 108 providing storage resources 1004 for allocation to at least two Client Systems (CS) 102; connecting a plurality of Client Systems (CS) 102 to the first datacenter 104, each Client System (CS) 102 having a set of infrastructure resources 106 and an initial networking configuration 1008; provisioning storage resources to at least two Client System (CS) 102; and uniquely identifying Layer 2 data traffic as between each Client System (CS) 102 and the first cloud computing environment 108 over OSI Layer 2 as a data link layer for the transfer of data frames distinct from the transfer of packets of a network layer, each frame having a plurality of OSI Layer 2 tags as unique identifiers permitting unique identification for each Client System (CS) 102, the OSI Layer 2 tags permitting segregation between Client Systems (CS) 102 to permit at least two Client Systems (CS) 102 to have overlapping network configurations 1008.

To further expand on FIGS. 1, 2 and 3, in FIG. 10 the Storage Array 1000 has been illustrated to demonstrate that the Storage Array 1000 itself encapsulates network traffic in/with a plurality of OSI Layer 2 tags. For at least one embodiment, this is achieved by implementing VXLAN which can then carry all encapsulated traffic over physical and logical connectivity to a provider network fabric over short or long haul networking between at least two VTEPs (VXLAN Tunnel End Points).

As noted above, for ease of illustration and to appreciate the achieved segregation of data, three logical conduits have been illustrated in FIG. 10 running from the Network Switch 116 to the Storage Array 1000, and within the Storage Array 1000 to each Virtual Storage Machine 1002 and associated Storage Volume 1006, however it is understood and appreciated that this data transmission is comingled—the distinction and/or segregation permitted because of the advantageous use of the plurality of Layer 2 tags.

It is further understood and appreciated that MTDC 100 providing storage permits each Client System 102 to access the Storage Array by native options expected by the default Client System 102. Moreover, in varying embodiments the Storage Volume (SV) 1006 is accessed by a protocol, such as but not limited to a protocol selected from the group consisting of: Network File System (NFS), internet Small Computer System Interface (iSCSI), Fiber Channel Over Ethernet (FCoE), and Common Internet File System (CIFS).

For at least one embodiment, at least one Virtual Storage Machine (VSM) 1002 provides at least one Storage Volume (SV) 1006 accessed by at least one Client System (CS) 102 at OSI Layer 3 or above. Moreover, it is understood and appreciated that having established the Layer 2 interconnection with Layer 2 tagging for segregation of the data traffic, the at least one Client System (CS) 102 may utilize and appreciate the extended resources of Storage Array 1000, transparently at Layer 3 or above.

For purposes of the present example and ease of illustration and discussion, the Storage Array data traffic has been expanded so as to clearly illustrate the potential VLANs, VNIs (VXLAN Network Identifiers), and IP address ranges associated with three exemplary Client Systems 102A, 102B, 102C.

More specifically, Client System (CS) 102A is shown to have network setting prescribing a Client IP 10.10.10.10/24 1008A and Client System (CS) 102B is shown to have network setting also prescribing Client IP 10.10.20.10/24 1008B; and Client System (CS) 102C is shown to have network setting prescribing Client IP 10.10.10.10/24 1008C.

From these exemplary settings it will be appreciated that Client Systems (CS) 102A and 102B overlap with respect to their default IP address ranges. Although a potentially serious issue for conventional cloud systems, the advantageous implementation of OSI Layer 2 tagging for segregating data traffic renders the potential issue of traffic confusion moot for the advantageous implementation of MTDC 100.

In other words, the plurality of OSI Layer 2 tags permits Client Systems (CS) 102 to utilize storage resources in isolation from other Client Systems (CS) 102. Further, for at least one embodiment, the plurality of OSI Layer 2 tags permits the association of overlapping layer 3 routing tables each with the initial client networking configuration for one or more Client Systems (CS) 102, without issue.

Moreover, for at least one embodiment, the plurality of OSI Layer 2 tags permits the association of overlapping layer 3 routing tables each with the initial client networking configurations 1010 for one or more Client Systems (CS) 102—a highly advantageous feature of MTDC 100 in accordance with the present invention.

Returning to the notation above of the Storage Array consisting at least in part of virtual systems such as the Virtual Storage Machines (VSMs) 1002, it should be understood and appreciated that one or more Virtual Network Interfaces Cards (VNICs) may be employed in the place of physical Network Interfaces (NICs). As virtual devices, these VNICs may be provided or removed as needed. Just as with physical NICs, the storage resources 1004 are accessed by one or more VNICs segregating data traffic by the plurality of Layer 2 tags.

Further still, for at least one embodiment, at least one Virtual Network Interface (VNIC) provides access to at least one Storage Volume (SV) 1006 accessed by at least one Client System (CS) 102 at OSI Layer 3 or above. And, for at least one embodiment, access through at least one Virtual Network Interface (VNIC) is achieved by a protocol selected from the group consisting of, but not exclusively limited to: Network File System (NFS), internet Small Computer System Interface (iSCSI), Fiber Channel Over Ethernet (FCoE), and Common Internet File System (CIFS).

With respect to this discussion of cloud based storage, it should be understood and appreciated that at least three general configurations may be provided, which may be combined or isolated from one another—1) the Storage Array 1000 (and more specifically the storage resources 1004, such as Storage Volumes (SVs) 1006) may be provided by the systems 110 within the same MTDC 100 that is hosting the Client System(s) 102; 2) the Storage Array 1000 may be provided by the systems 110 in a second MTDC 200 located in a second physical location as shown in FIG. 2 which also may host at least one client system; and 3) the cloud Storage Array 1000 may be provided in a MTDC 100/200, which although capable of hosting one or more Client Systems 102, has been structured and arranged more specifically as a cloud storage facility, and which may have local and remote client systems 102.

It should be understood and appreciated that systems 110A and 110B provide storage resources as conceptually illustrated in FIG. 10. However, in optional embodiments, additional systems may participate in providing storage resources 1004, and those systems may also provide additional resources in addition to storage, for the extension of resources of one or more Client Systems 102.

FIG. 10 presents an exemplary conceptualization for case 1 and case 2 where the Storage Array 1000 and at least some client systems 102 are physically located within the same first datacenter 104 (case 1). In addition, the third client system 102C is shown located in a second datacenter 204, and connecting via switch 124 (case 2). It should be understood and appreciated that the network traffic from Client System 102C may be coupled to Virtual Storage Machine 1002C by encapsulation in the same manner as Client System 102A, as described above, or by another device, such as switch 124, along the path of the transmission of data.

Figure 11:
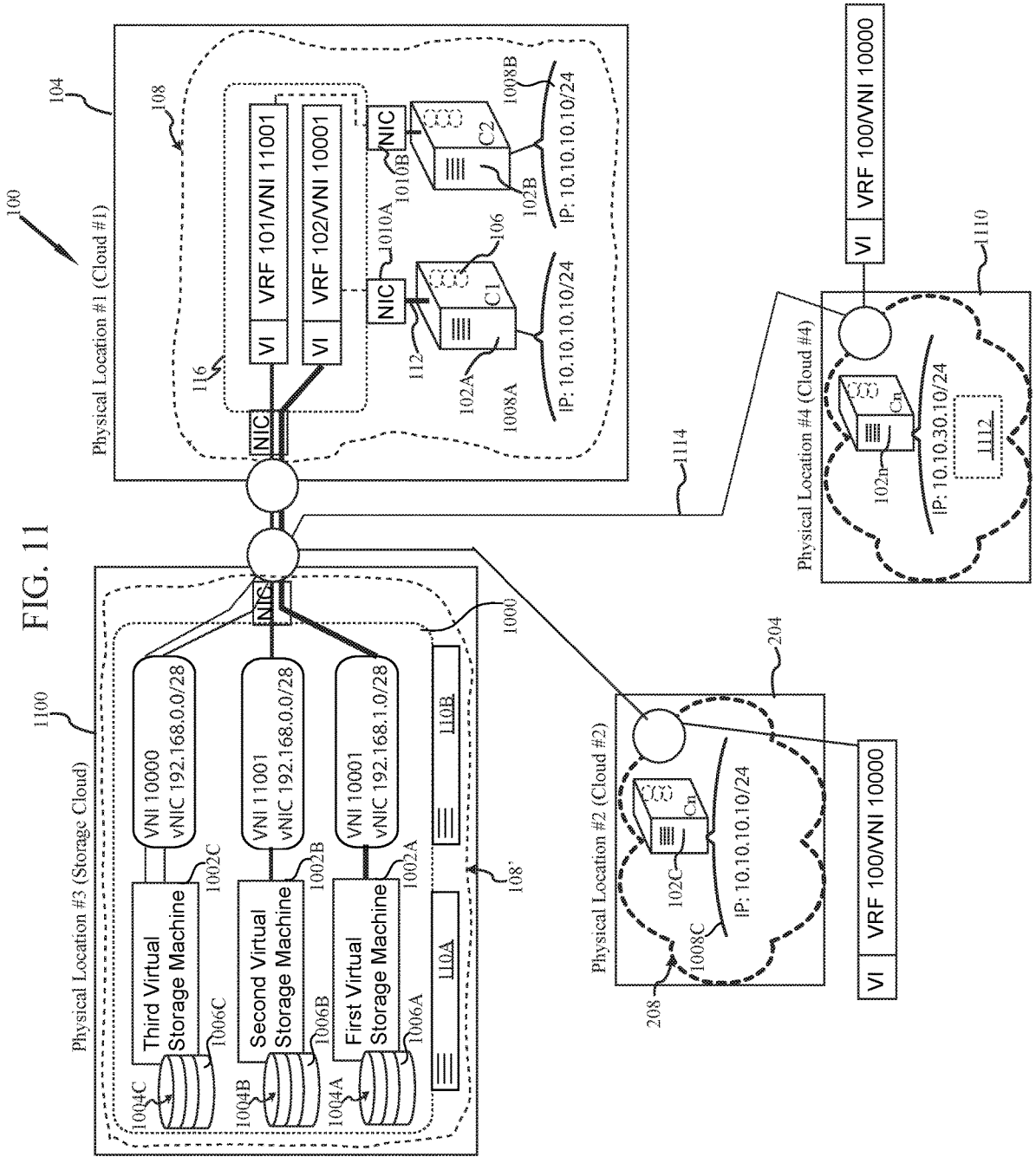
FIG. 11 illustrates a conceptual view of multiple multi-tenant datacenter with Layer 2 cloud interconnection interconnected and providing cloud storage in accordance with at least one embodiment of the present invention.

FIG. 11 presents a conceptualization for case 3. Here at least the first Client System (CS) 102A and the second Client System (CS) 102B are located within a first datacenter 104, at least the third Client System (CS) 102C is located within a second datacenter 204, and the Storage Array 1000 is located in yet a third datacenter 1100. This third datacenter 1100, provides a cloud environment substantially as 108 describe above, thus identified as 108'—the cloud environment 108', providing the storage resources 1004, and more specifically the Storage Volumes (SV) 1006.

In addition, FIG. 11 presents a fourth datacenter 1110 having an n'th Client System (CS) 102n located within the fourth data center 1110. This fourth data center 1110 may also have a Storage Array 1112 substantially as described herein. As is shown conceptually by line 1114, at least Client System (CS) 102n is exchanging storage data with the same Third Virtual Storage Machine 1002C third datacenter 1100. As such, Client System 102C of Cloud #1 in Physical Location #1 and Client System 102n of Cloud #4 in Physical Location #4 are effectively sharing access to the same extended storage provided by Third Virtual Storage Machine 1002C in Cloud #3 in Physical Location #3, such that they may each transparently produce, consume and otherwise enjoy usage of updates and changes to storage data made in substantially real time by either Client System (CS) 102C and/or Client System (CS) 102n.

Further, although Client System (CS) 102C and Client System (CS) 102n are shown to have different IP addresses, by way of the advantageous extension of infrastructure resources, and specifically storage resources as shown and herein described, Client System (CS) 102C and Client System (CS) 102n are able to transparently access the same storage resources provided by Third Virtual Storage Machine 1002C at Layer 3.

Moreover, Client Systems (CS) 102 may consume storage resources that are local, or remote—and may optionally enjoy access to both local and remote storage resources. Further Client Systems (CS) 102 (such as Client System 102C and Client System (CS) 102n) may enjoy transparent access and intersection with the same extended storage resources such that different systems in different physical locations are able to utilize and share data by way of the MTDC 100. Indeed, those skilled in the art will understand and appreciate that the Storage Arrays 1000/1112 themselves may interact and transparently share storage data, and transparently present shared storage data to one or more Client Systems (CS) 102.

To summarize, for at least one embodiment, provided is a datacenter 104/1100 providing cloud storage for Client Systems (CS) 102, utilizing OSI Layer 2 tags to segregate transmission data in Layer 2 Frames, comprising: a first datacenter (FDC) 104 providing a first cloud computing environment 108 having Layer 2 architecture to maintain a plurality of original client Layer 2 configurations 1008, the first datacenter 104 having first physical resources and first virtual resources structured and arranged to provide storage resources for allocation to at least two Client Systems (CS); a second datacenter (SDC) 204 providing a second cloud computing environment 208 having Layer 2 architecture to maintain a plurality of original client Layer 2 configurations 1008, the second datacenter 204 having second physical resources and second virtual resources structured and arranged to provide storage resources for allocation to at least two Client Systems (CS) 102, and coupled to the first datacenter 104 by OSI Layer 2 as a data link layer for the transfer of data frames, each frame having a plurality of OSI Layer 2 tags, the plurality of OSI Layer 2 tags permitting at least two systems utilizing the coupled first datacenter 104 and second datacenter 204 to have overlapping network configurations.

And yet further, in another embodiment, provided is a method for providing a datacenter 104/1100 having Layer 2 architecture to segregate and maintain original client Layer 2 configurations 1008 and permit software defined networking, comprising: establishing within a first datacenter 104 a first cloud computing environment having Layer 2 architecture to maintain a plurality of original client Layer 2 configurations 1008, the first datacenter 104 having first physical resources and first virtual resources structured and arranged to provide storage resources 1004 for allocation to at least two Client Systems (CS) 102; establishing within a second datacenter 204 a second cloud computing environment 208 having Layer 2 architecture to maintain a plurality of original client Layer 2 configurations 1008, the second datacenter 204 having second physical resources and second virtual resources structured and arranged to provide storage resources for allocation to at least two Client Systems (CS) 102; and coupling the first cloud computing environment 108 to the second cloud computing environment 208 OSI Layer 2 as a data channel for the transfer of data frames, each frame having a plurality of OSI Layer 2 tags, the plurality of OSI Layer 2 tags permitting segregation between systems so at least two systems utilizing the coupled first datacenter 104 and second datacenter 108 may have overlapping network configurations.

Of course, it is understood and appreciated, that for varying embodiments the Storage Array 1000 may be in a datacenter that is entirely physically separate from the datacenter(s) and client systems that are utilizing the Storage Array 100 as permitted by the advantageous layer 2 tagging of MTDC 100. Likewise, each datacenter may provide a local Storage Array 1000 for at least its local client systems. And further, because different datacenters may provide different Storage Arrays 1000, embodiments of MTDC 100 may advantageously provide storage resiliency and redundancy.

Figure 12:
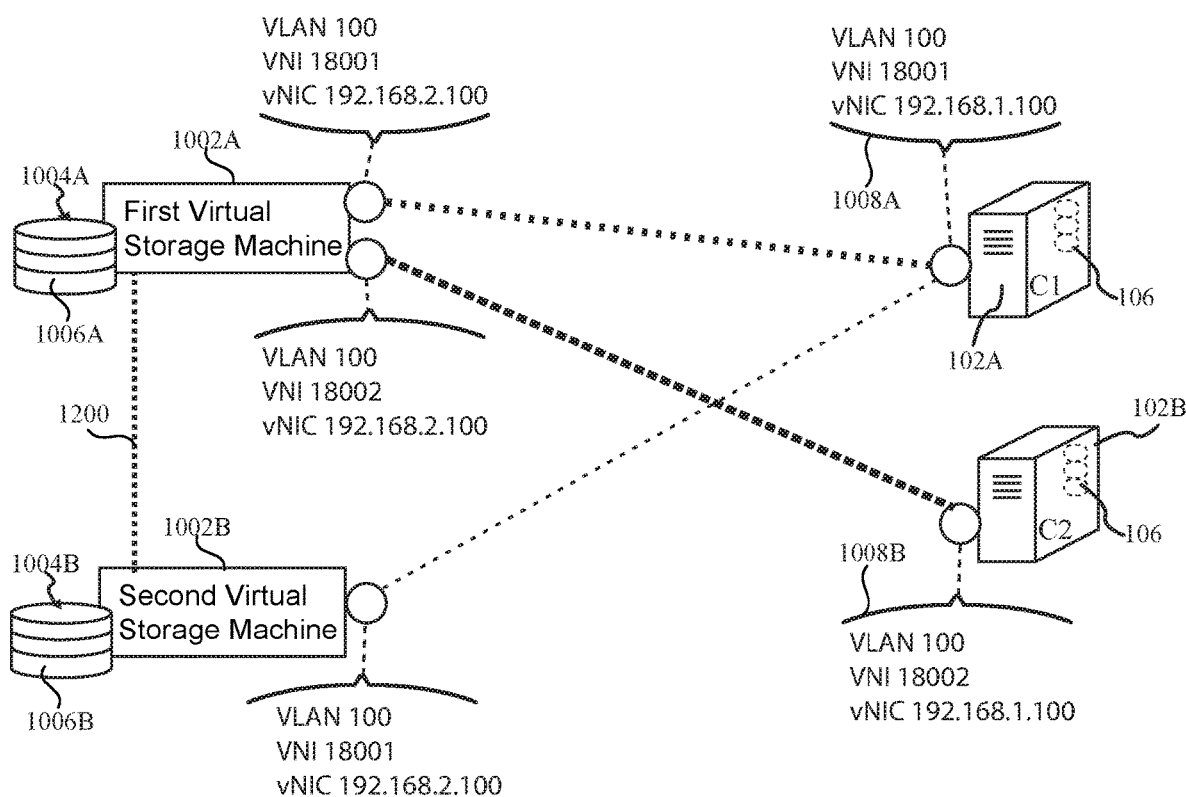
FIG. 12 presents a conceptual view of a multi-tenant data center providing cloud storage and redundant cloud storage in accordance with at least one embodiment of the present invention.

FIG. 12 conceptually illustrates the advantageous nature of resiliency and redundancy permitted by at least one embodiment of MTDC 100. More specifically, as shown in FIG. 12, with respect to the issues of resiliency and redundancy, for at least one embodiment, a First Virtual Storage Machine (FVSM) 1002A is utilized as primary storage and at least one Second Virtual Storage Machine (SVSM) 1002B is utilized as Redundancy to the First Virtual Storage Machine (FVSM) 1002A.

For at least one embodiment, this redundancy of First Virtual Storage Machine (FVSM) 1002A by Second Virtual Storage Machine (SVSM) 1002B is achieved by additional configuration within the Storage Array 1000 itself or within the datacenter, as indicated by data link 1200, such that the data from First Virtual Storage Machine (FVSM) 1002A is copied to Second Virtual Storage Machine (SVSM) 1002B.

For at least one alternative embodiment, this redundancy First Virtual Storage Machine (FVSM) 1002A by Second Virtual Storage Machine (SVSM) 1002B is achieved additional configuration outside of the Storage Array 1000, such as by additional configuration to one or more switches 116 and/or one or more physical or virtual systems disposed along the communication link between the Client System (CS) 102A and the First Virtual Storage Machine (FVSM) 1002A, such that access to redundant storage provided by Second Virtual Storage Machine (SVSM) 1002B is transparent to the Client System 102 in the event of a failure of the First Virtual Storage Machine (FVSM) 1002A.

For at least one embodiment, this copying is performed substantially concurrently with the write data requests as provided to the First Virtual Storage Machine (FVSM) 1002A. As used herein, substantially concurrently is understood and appreciated to be at about the same time as permitted by the physical and virtual elements of MTDC 100. For at least one alternative embodiment, the copying is performed intermittently, such as at specific time intervals or at one or more specific times. For yet another embodiment, the copying is performed as a batch operation, occurring at such time as a sufficient number of changes and/or updates have occurred to trigger the batch processing event.

In the event of First Virtual Storage Machine (FVSM) 1002A going offline—such as due to failure, maintenance, network issue or other event, the advantageous use of the Layer 2 tags, permits MTDC 100 to dynamically shift all data traffic intended for First Virtual Storage Machine (FVSM) 1002A to Second Virtual Storage Machine (SVSM) 1002B, such a shift occurring transparently to the Client System (CS) 102.

More simply put, at least one Layer 2 tag is attached to designate First Virtual Storage Machine (FVSM) 1002A as the storage system for Client System 102A. However, for redundancy purposes, that same Layer 2 tag may be associated with Second Virtual Storage Machine (SVSM) as well, with a plurality of additional Layer 2 tags used to transparently associate traffic from Client System(s) 102 to either First Virtual Storage Machine (FVSM) 1002A or Second Virtual Storage Machine (SVSM) 1002B, permitting the Storage Virtual Machines to have overlapping network configurations.

Moreover, for at least one embodiment, at least one Second Virtual Storage Machine (SVSM) is accessed by a First Client System (SM) using a network configuration for the First Virtual Storage Machine (FVSM) utilizing dynamic encapsulation to present the Second Virtual Storage Machine (SVSM) to the at least First Client System.

Figure 13:
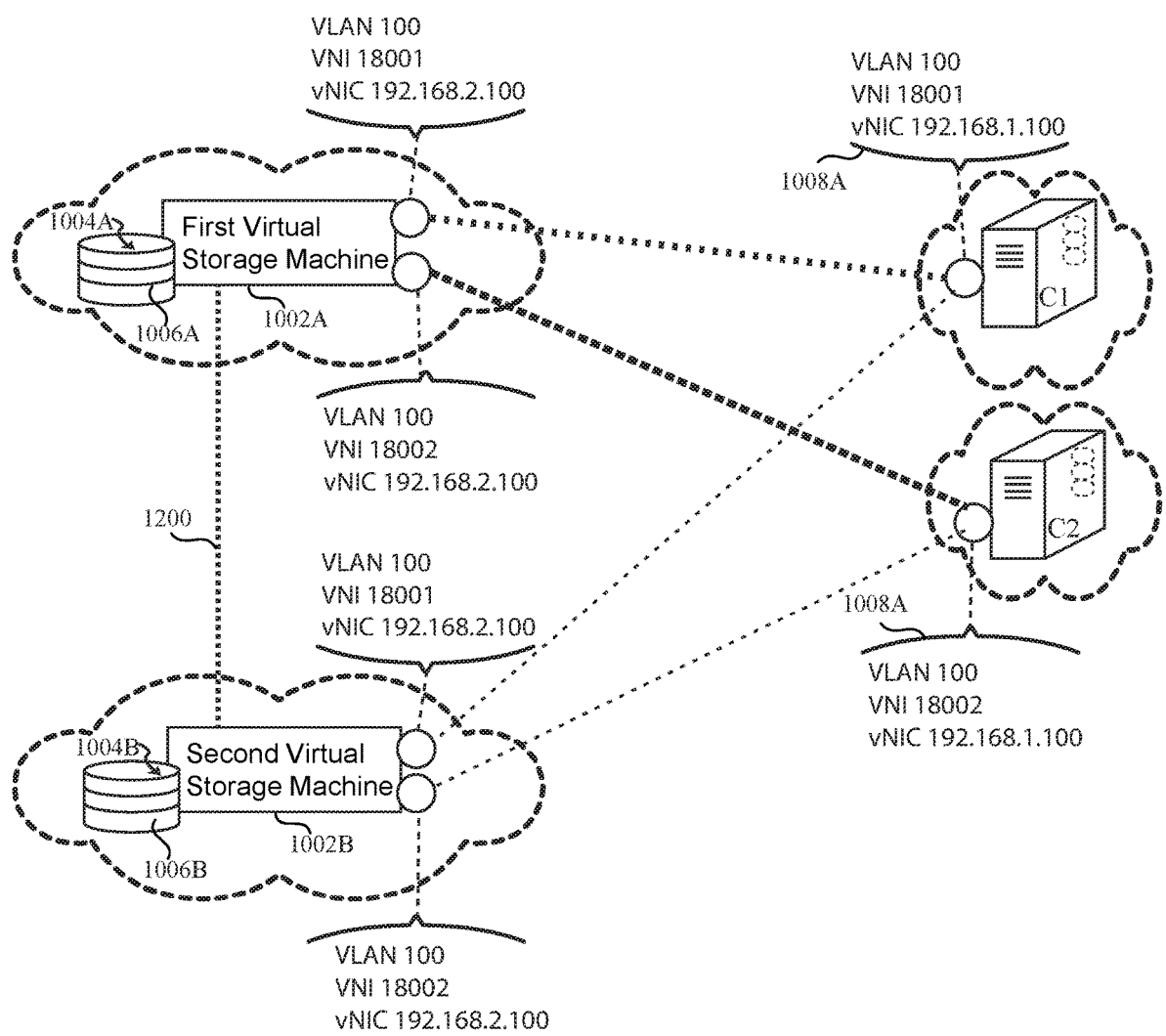
FIG. 13 presents a conceptual view of a multiple multi-tenant data center providing storage and redundant cloud storage in accordance with at least one embodiment of the present invention.

FIG. 13 is a further extension of FIG. 12, further illustrating that the primary Virtual Storage Machine(s), e.g. First Virtual Storage Machine 1002A, may be in one cloud environment 1300 while the secondary Virtual Storage Machines(s), e.g. Second Virtual Storage Machine 1002B, may be in a second cloud environment 1302, the first cloud environment 1300 being physically separate from the second cloud environment 1302. Likewise, client system 102A may be in yet another cloud environment 1304 while client system 102B is in still yet another cloud environment 1306.

Although FIG. 13 has been conceptually illustrated to show cloud environment 1300 as the primary storage environment for both Client Systems (CS) 102A and 102B, with cloud environment 1302 as the secondary storage environment for both for both Client Systems (CS) 102A and 102B, for an alternative embodiment, cloud environment 1302 could provide the primary storage environment for client system 102B while providing secondary storage environment for client system 102A, and cloud environment 1300 could provide the primary storage environment for client system 102A while providing secondary storage environment for client system 102B. In other words, different cloud environments may be configured to provide primary, secondary, or even additional redundancy for different client systems 102.

Figure 7:
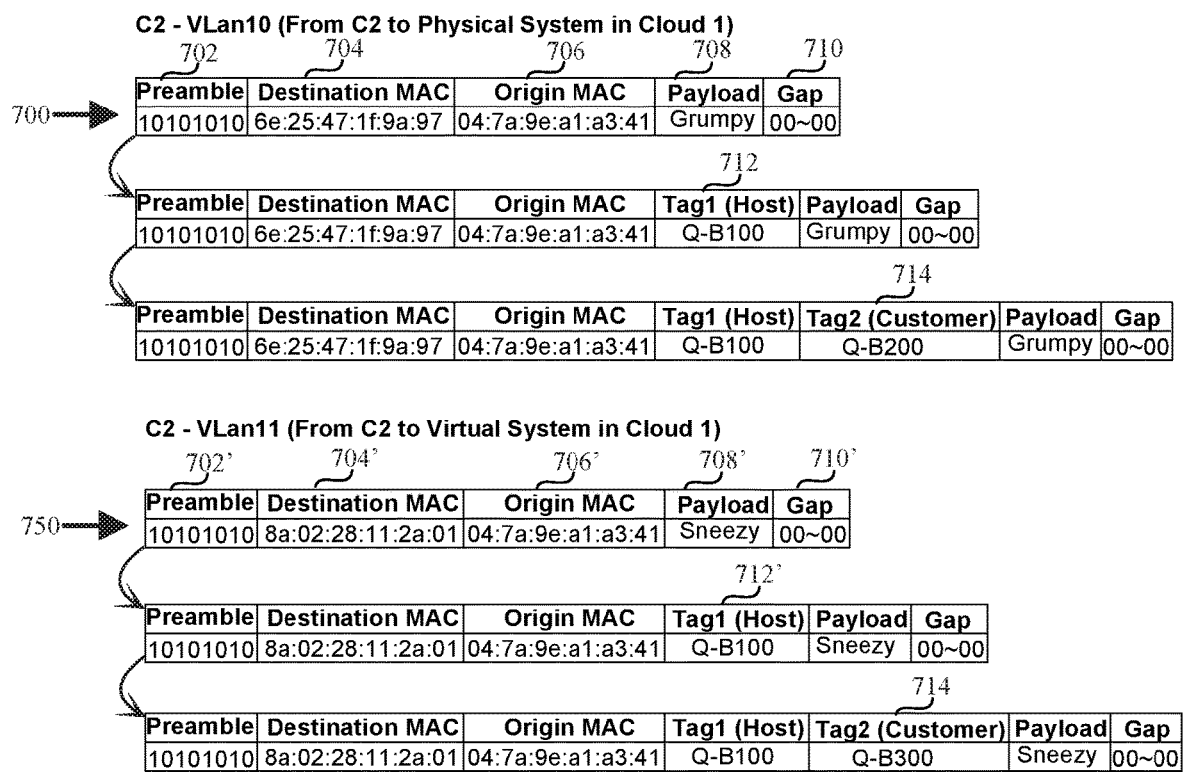
FIG. 7 illustrates yet other exemplary frames and their Layer 2 tagging for communication between a client system and a cloud system within a common datacenter in accordance with at least one embodiment of the present invention.
Figure 8:
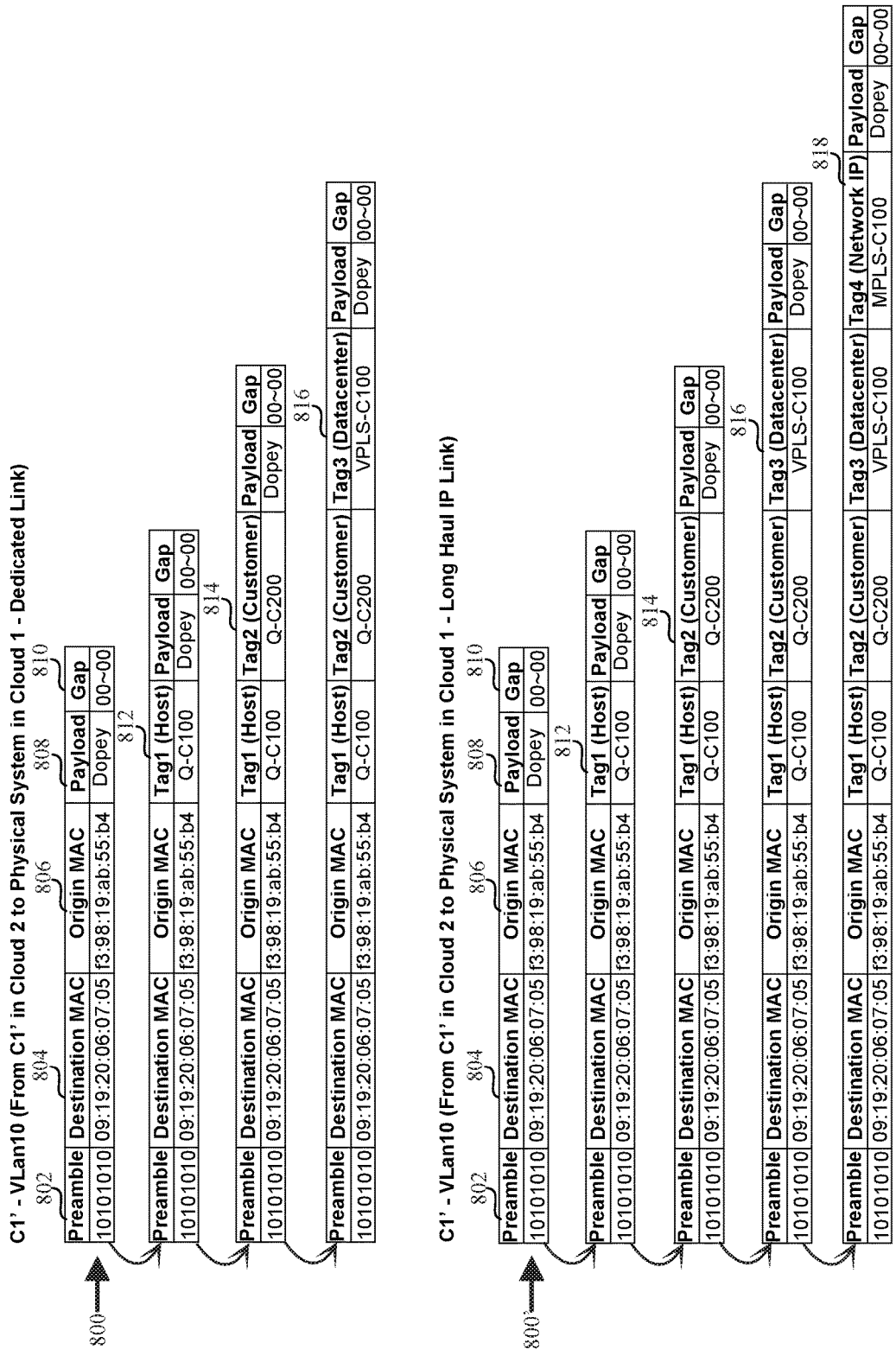
FIG. 8 illustrates yet other exemplary frames and their Layer 2 tagging for communication between a client system and a cloud system in different physical datacenters in accordance with at least one embodiment of the present invention.

Returning to the advantageous nature of Layer 2 tagging as utilized in MTDC 100, FIGS. 6, 7 and 8 provide conceptual examples of this OSI Layer 2 tagging for the unique identification each frame and are provided to further assist in appreciating the method of providing a multi-tenant datacenter.

More specifically, FIG. 6 illustrates a frame as between C1, client system 102A (having origin MAC address 57:89:6f:88:9d:c7), and physical cloud system 110A (having destination MAC address 28:08:80:52:17:20) and a payload 608 "Happy". For ease of illustration and discussion, the OSI Layer 2 tags as employed have been illustrated conceptually in an easy to read and understand manner. Client system 102A has been assigned A series tags, and an appropriate Tag 1 612 and Tag2 614 demonstrate this. For the sake of example, the IP ranges for the LAN of client system 102A may be 10.20.30.0-50.

FIG. 7 illustrates two frames, 700 and 750. The first, illustrates a frame 700 as between C2, client system 102B (having origin MAC address 04:7A:9e:a1:a3:41), and physical cloud system 110B (having destination MAC address 6e:25:47:1f9a:97). Frame 700 has the same basic structure as frame 600, a preamble 702, destination MAC 704, origin Mac 706, a payload 708 and a gap sequence 710. For frame 700 the payload 708 is "Grumpy".

Client system 102B has been assigned B series tags as demonstrated by Tag1 712 and Tag2 714. For the sake of example, the IP ranges for the LAN of client system 102B may be 10.20.30.20-80. As such, clearly there is the possibility for overlapping IP addresses with client system 102A and client system 102B, those between 10.20.30.20 and 10.20.30.50. However, as neither frame 600 nor frame 700 includes a tag for representation of an IP address as specified by either the origin or the destination, any overlapping of IP addresses is of no consequence and will not interfere with the delivery of the frames.

As noted above, in at least one embodiment, the first cloud 108 comprises at least one virtual machine which is structured and arranged to provide infrastructure services to at least one client system 102. FIG. 7 also illustrates a frame 750 as between C2, client system 102B (having origin MAC address 04:7A:9e:a1:a3:41), and virtual cloud system 110C (having destination MAC address 8a:02:28:11:2a:01) and a payload 708 "Sneezy".

As noted with respect to frame 700, client system 102B has been assigned B series tags. As such for this example Tag1 712' for the host in frame 750 is the same as Tag1 712 in frame 700. However, the customer in this example is different so Tag2 714' is different. Moreover, for the purposes of tagging frame 750 the nature of the destination system as being virtual is substantially irrelevant.

Returning to method 500 in FIG. 5, a query is performed to determine if the requested resource is within the current cloud, decision 526. For the example frames 600, 700 and 750 the answer is "Yes" as the client systems, respectively 102A, 102B and 102C are all within the first datacenter 104, and each frame 600, 700 and 750 indicates the destination system is within the first cloud 108.

As such, switch 116 directs each frame from the received port 120 to the proper outbound port 122 to which is coupled the desired resource. It is also understood and appreciated that switch 116 will remove the OSI Layer 2 tags that are not expected, block 528. More specifically, if the client system is employing a VLAN and has employed use of a Q Tag, that Q Tag will remain, but the additional OSI Layer 2 tags applied by MTDC 100 are removed at the time of delivery, such that the physical or virtual resource in the cloud receives the frame in expected form, block 530.

FIG. 8 illustrates a frame as between C1', client system 202 (having origin MAC address f3:98:19:ab:55:b4), and physical cloud system 110D (having destination MAC address 09:19:20:07:05). It is also appreciated that client system 202 is in second datacenter 204 and physical cloud system 110D is in first cloud 108. Frame 800 has the same basic structure as frame 600, a preamble 802, destination MAC 804, origin Mac 806, a payload 808 and a gap sequence 810. For frame 800 the payload 808 is "Dopey".

Client system 202 has been assigned C series tags as demonstrated by Tag1 812, Tag2 814 and Tag3 816. Tag3 816 is identifying the datacenter having the resource, specifically the first datacenter 108. For at least one embodiment the additional OSI Layer 2 tag identifying the datacenter, e.g., Tag3 816 is a VPLS tag.

Returning to decision 526, in the event that it is determined that the resource is not in the current cloud, as in the case of frame 800, method 500 proceeds to add appropriate OSI Layer 2 tagging to identify the datacenter containing the resource, block 532. The frame, e.g., frame 800, is then directed to the proper cloud, block 534.

With respect to FIG. 2, it is appreciated that frame 800 is provided from switch 212, to switch 222, to switch 220, and finally to switch 116, and that that switch 116 will remove the OSI Layer 2 tags that are not expected, block 528.

Again as noted above, in at least one embodiment existing network provider connections may be used to interconnect different datacenters. In FIG. 8 frame 800' represents the additional OSI Layer 2 tagging that may be applied in at least one embodiment to enable use of the existing network connections as shown in FIG. 3. In addition to Tag3 identifying the datacenter, Tag4 818 has been added to identify the long haul network IP. For at least one embodiment the additional OSI Layer 2 tag identifying the network IP, e.g., Tag4 818 is a MPLS tag.

Moreover, for this optional use of an existing long haul interconnection, method 500 adds a fourth OSI Layer 2 tag to identify the network IP, block 536 and the frame is transferred from one datacenter to another. In at least one embodiment the addition of this fourth OSI Layer 2 tag is performed by router, e.g., router 302 in FIG. 3, and then removed by router 300, such that the layer 3 transfer is entirely transparent, block 538.

Once again it will be appreciated that the use of Layer 2 tags selected from the group consisting of, but not limited to, Q tags, QinQ tags, MPLS tags, VPLS tags, Segment ID tags, Global VLAN tags, is understood as exemplary for one or more embodiments, and not as limitations. Indeed other current and developing protocols that permit Layer 2 extension are understood and appreciated to fall within the present teachings for Layer 2 tagging.

With the frame delivered, the method 500 moves to decision 540 and the query of whether to continue or not. When the system remains active, MTDC 100 awaits new data, block 542, which may be in the form of a new client VLAN being added, a new frame from a client system, or a new frame from an extended resource within the cloud. Indeed, although the above description has been presented for the progression of a frame from a client system to a resource within the cloud, it is understood and appreciated that generally the same process is performed to transfer a frame from an extended resource within the cloud to an associated client system. Moreover, with respect to frame 600, interchanging the origin MAC address and 604 and the destination MAC address 606 would provide a frame for transfer from system 110A in the first cloud 108 to client system 102A.

To summarize, for at least one embodiment, a method of providing MTDC 100 consists of establishing within a first datacenter 104 a first cloud 108 having first physical resources and first virtual resources and establishing within a second datacenter 204 a second cloud 208 having second physical resources and second virtual resources. The first cloud 108 and the second cloud 208 are coupled together by OSI Layer 2.

Further, for at least one embodiment, this method of providing MTDC 100 is enhanced by disposing a plurality of physical client systems, e.g., 102 and 202 in one or both of the first datacenter 104 and the second datacenter 204, each physical client system having a set of physical infrastructure resources 106, 206. The method continues by coupling each physical client system, 102, 202 to the coupled first and second clouds 108, 208 by OSI Layer 2, the coupled cloud computing environment thereby virtually extending the physical infrastructure resources 106, 206 of each physical client system 102, 202.

Figure 9:
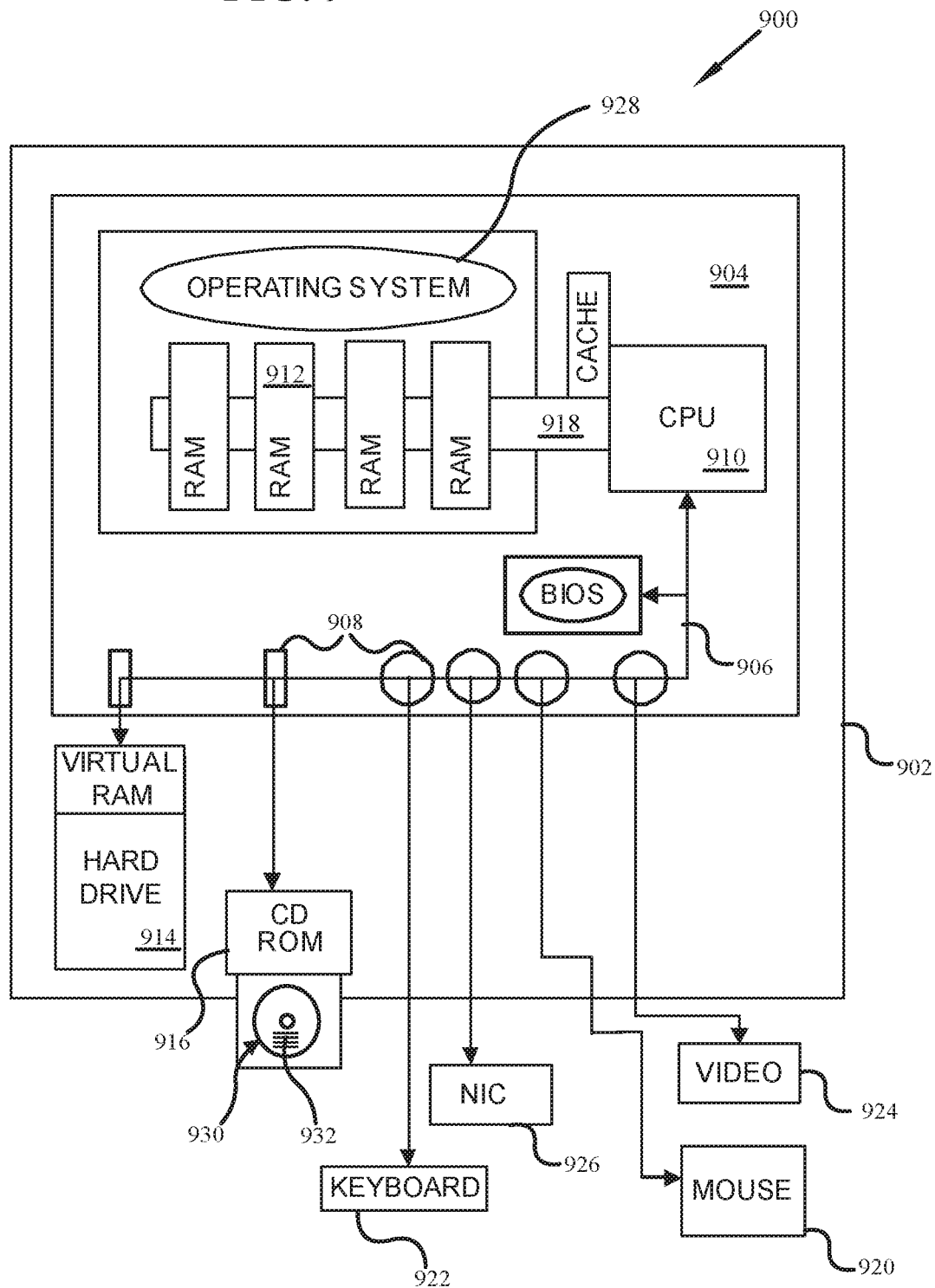
FIG. 9 is a block diagram of a computer system in accordance with certain embodiments of the present invention.

With respect to the above description of MTDC 100, multiple instances of MTDCs, and methods 400 and 500 it is understood and appreciated that the method may be rendered in a variety of different forms of code and instruction as may be used for different computer systems and environments. To expand upon the initial suggestion of client systems 102 and cloud systems 110, FIG. 9 is a high level block diagram of an exemplary computer system 900. Computer system 900 has a case 902, enclosing a main board 904. The main board 904 has a system bus 906, connection ports 908, a processing unit, such as Central Processing Unit (CPU) 910 with at least one microprocessor (not shown) and a memory storage device, such as main memory 912, hard drive 914 and CD/DVD ROM drive 916.

Memory bus 918 couples main memory 912 to the CPU 910. A system bus 906 couples the hard disc drive 914, CD/DVD ROM drive 916 and connection ports 908 to the CPU 910. Multiple input devices may be provided, such as, for example, a mouse 920 and keyboard 922. Multiple output devices may also be provided, such as, for example, a video monitor 924 and a printer (not shown). As computer system 900 is intended to be interconnected with other computer systems in the MTDC 100 a combined input/output device such as at least one network interface card, or NIC 926 is also provided.

Computer system 900 may be a commercially available system, such as a desktop workstation unit provided by IBM, Dell Computers, Gateway, Apple, or other computer system provider. Computer system 900 may also be a networked computer system, wherein memory storage components such as hard drive 914, additional CPUs 910 and output devices such as printers are provided by physically separate computer systems commonly connected together in the network. Those skilled in the art will understand and appreciate that the physical composition of components and component interconnections are comprised by the computer system 900, and select a computer system 900 suitable for one or more of the computer systems incorporated in the formation and operation of MTDC 100.

When computer system 900 is activated, preferably an operating system 926 will load into main memory 912 as part of the boot strap startup sequence and ready the computer system 900 for operation. At the simplest level, and in the most general sense, the tasks of an operating system fall into specific categories, such as, process management, device management (including application and user interface management) and memory management, for example. The form of the computer-readable medium 928 and language of the program 930 are understood to be appropriate for and functionally cooperate with the computer system 900.

Moreover, variations of computer system 900 may be adapted to provide the physical elements of one or more components comprising each client system 102, the one or more components comprising the system 110 supporting the cloud environment, the switches, routers and such other components as may be desired and appropriate for MTDC 100.

It is to be understood that changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A datacenter providing cloud storage for Client Systems (CS), utilizing OSI Layer 2 tags to segregate transmission data between Client Systems (CS) and the datacenter providing cloud storage, comprising:
    a plurality of Client Systems (CS) coupled to a first datacenter each Client System (CS) having a set of infrastructure resources and an initial networking configuration; and
    a first cloud computing environment established in the first datacenter, and coupled to the Client Systems (CS) by OSI Layer 2 as a data link layer for the transfer of data frames, each frame having a plurality of OSI Layer 2 tags, the first cloud computing environment providing storage resources for allocation to at least two Client Systems (CS), the plurality of OSI Layer 2 tags permitting the at least two Client Systems (CS) to have overlapping network configurations.

2. The datacenter of claim 1, wherein the storage resources are accessed through one or more Virtual Storage Machines (VSM).

3. The datacenter of claim 2, wherein at least one Client Systems (CS) utilizes at least one Storage Volume (SV) by accessing at least one Virtual Storage Machine (VSM).

4. The datacenter of claim 3, wherein the Storage Volume (SV) is accessed by a protocol selected from the group consisting of: Network File System (NFS), internet Small Computer System Interface (iSCSI), Fiber Channel Over Ethernet (FCoE), and Common Internet File System (CIFS).

5. The datacenter of claim 2, wherein at least one Virtual Storage Machine (VSM) provides at least one Storage Volume (SV) accessed by at least one Client System (CS) at OSI Layer 3 or above.

6. The datacenter of claim 2, wherein a First Virtual Storage Machine (FVSM) is utilized as primary storage and at least one Second Virtual Storage Machine (SVSM) is utilized as Redundancy to the First Virtual Storage Machine (FVSM).

7. The datacenter of claim 6, wherein at least one Second Virtual Storage Machine (SVSM) is accessed by a First Client System (SM) using a network configuration for the First Virtual Storage Machine (FVSM) utilizing dynamic encapsulation to present the Second Virtual Storage Machine (SVSM) to the at least First Client System.

8. The datacenter of claim 2, wherein the plurality OSI Layer 2 tags permit Client Systems (CS) to utilize storage resources in isolation from other Client Systems (CS).

9. The datacenter of claim 1, wherein the plurality of OSI Layer 2 tags permits the association of Overlapping layer 3 routing tables each with the initial client networking configuration for one or more one client system (CS).

10. The datacenter of claim 1, wherein the storage resources are accessed by one or more Virtual Network Interfaces (VNic) segregating data traffic by the plurality of OSI Layer 2 tags.

11. The datacenter of claim 10, wherein at least one Client Systems (CS) utilizes at least one Storage Volume (SV) by accessing at least one Virtual Network Interface (VNic).

12. The datacenter of claim 10, wherein at least one Client Systems (CS) utilizes at least one Storage Volume (SV) by utilizing at least one Virtual Network Interface (VNic).

13. The datacenter of claim 11, wherein the Storage Volume is accessed by a protocol selected from the group consisting of: Network File System (NFS), internet Small Computer System Interface (iSCSI), Fiber Channel Over Ethernet (FCoE), and Common Internet File System (CIFS).

14. The datacenter of claim 10, wherein at least one Virtual Network Interface (VNic) provides access to at least one Storage Volume (SV) accessed by at least one Client System (CS) at OSI Layer 3 or above.

15. The datacenter of claim 10, wherein the plurality OSI Layer 2 tags permit Client Systems (CS) to utilize storage resources in isolation from other Client Systems (CS).

16. A method for providing a cloud storage datacenter, utilizing OSI Layer 2 tags to segregate transmission data between Client Systems (CS), comprising:
   establishing within a first datacenter a first cloud computing environment providing storage resources for allocation to at least two Client Systems (CS);
   connecting a plurality of Client Systems (CS) to the first datacenter, each Client System (CS) having a set of infrastructure resources and an initial networking configuration;
   provisioning storage resources to at least two Client System (CS); and
   uniquely identifying Layer 2 data traffic as between each Client System (CS) and the first cloud computing environment over OSI Layer 2 as a data link layer for the transfer of data frames distinct from the transfer of packets of a network layer, each frame having a plurality of OSI Layer 2 tags as unique identifiers permitting unique identification for each Client System (CS), the OSI Layer 2 tags permitting segregation between Client Systems (CS) to permit at least two Client Systems (CS) to have overlapping network configurations.

17. The method of claim 16, wherein the storage resources are accessed through one or more Virtual Storage Machines (VSM).

18. The method of claim 17, wherein at least one Client Systems (CS) utilizes at least one Storage Volume (SV) by accessing at least one Virtual Storage Machine (VSM).

19. The datacenter of claim 16, wherein the Storage Volume (SV) is accessed by a protocol selected from the group consisting of: Network File System (NFS), internet Small Computer System Interface (iSCSI), Fiber Channel Over Ethernet (FCoE), and Common Internet File System (CIFS).

20. The method of claim 17, wherein at least one Virtual Storage Machine (VSM) provides at least one Storage Volume (SV) accessed by at least one Client System (CS) at OSI Layer 3 or above.

21. The method of claim 17, wherein a First Virtual Storage Machine (FVSM) is utilized as primary storage and at least one Second Virtual Storage Machine (SVSM) is utilized as Redundancy to the First Virtual Storage Machine (FVSM).

22. The method of claim 21, wherein at least one Second Virtual Storage Machine (SVSM) is accessed by a First Client System (SM) using the network configuration for the First Virtual Storage Machine (FVSM) utilizing dynamic encapsulation to present the Second Virtual Storage Machine (SVSM) to the at least First Client System.

23. The method of claim 17, wherein the plurality OSI Layer 2 tags permit Client Systems (CS) to utilize storage resources in isolation from other Client Systems (CS).

24. The method of claim 16, wherein the plurality of OSI Layer 2 tags permits the association of Overlapping (Original) layer 3 routing tables each with the initial client networking configuration for one or more one client system (CS).

25. The method of claim 16, wherein the storage resources are accessed by one or more Virtual Network Interfaces (VNic) segregating data traffic by the plurality of OSI Layer 2 tags.

26. The method of claim 25, wherein at least one Client Systems (CS) utilizes at least one Storage Volume (SV) by accessing at least one Virtual Network Interface (VNic).

27. The method of claim 25, wherein at least one Client Systems (CS) utilizes at least one Storage Volume (SV) by utilizing at least one Virtual Network Interface (VNic).

28. The method of claim 26, wherein the Storage Volume is accessed by a protocol selected from the group consisting of: Network File System (NFS), internet Small Computer System Interface (iSCSI), Fiber Channel Over Ethernet (FCoE), and Common Internet File System (CIFS).

29. The method of claim 25, wherein at least one Virtual Network Interface (VNic) provides access to at least one Storage Volume (SV) accessed by at least one Client System (CS) at OSI Layer 3 or above.

30. The method of claim 25, wherein the plurality OSI Layer 2 tags permit Client Systems (CS) to utilize storage resources in isolation from other Client Systems (CS).

31. A datacenter providing cloud storage for Client Systems (CS), utilizing OSI Layer 2 tags to segregate transmission data in Layer 2 Frames, comprising:
   a first datacenter (FDC) providing a first cloud computing environment having Layer 2 architecture to maintain a plurality of original client Layer 2 configurations, the first datacenter having first physical resources and first virtual resources structured and arranged to provide storage resources for allocation to at least two Client Systems (CS);

a second datacenter (SDC) providing a second cloud computing environment having Layer 2 architecture to maintain a plurality of original client Layer 2 configurations, the second datacenter having second physical resources and second virtual resources structured and arranged to provide storage resources for allocation to at least two Client Systems (CS), and coupled to the first datacenter by OSI Layer 2 as a data link layer for the transfer of data frames, each frame having a plurality of OSI Layer 2 tags, the plurality of OSI Layer 2 tags permitting at least two systems utilizing the coupled first datacenter and second datacenter to have overlapping network configurations.

32. The datacenter of claim 31, further comprising:
a plurality of Client Systems (CS) coupled to one or both of the first datacenter and the second datacenter, each Client System (CS) having a set of infrastructure resources and initial networking configuration, each Client System (CS) coupled to the first and second cloud computing environment by OSI Layer 2 for the transfer of data frames, each frame having a plurality of OSI Layer 2 tags the first cloud computing environment and second cloud computing environment providing storage resources for allocation to at least two Client Systems (CS), the plurality of OSI Layer 2 tags permitting the least two Client Systems (CS) to have overlapping network configurations.

33. The datacenter of claim 32, wherein the storage resources are accessed through one or more Virtual Storage Machines (VSM).

34. The datacenter of claim 32, wherein the plurality of OSI Layer 2 tags permits one or more VSMs of the first datacenter to have overlapping network configurations with one or more VSMs of the second datacenter.

35. The datacenter of claim 32, wherein at least one Client Systems (CS) utilizes at least one Storage Volume (SV) by accessing at least one Virtual Storage Machine (VSM).

36. The datacenter of claim 35, wherein the Storage Volume (SV) is accessed by a protocol selected from the group consisting of: Network File System (NFS), internet Small Computer System Interface (iSCSI), Fiber Channel Over Ethernet (FCoE), and Common Internet File System (CIFS).

37. The datacenter of claim 33, wherein at least one Virtual Storage Machine (VSM) provides at least one Storage Volume (SV) accessed by at least one Client System (CS) at OSI Layer 3 or above.

38. The datacenter of claim 33, wherein the plurality OSI Layer 2 tags permit Client Systems (CS) to utilize storage resources in isolation from other Client Systems (CS).

39. The datacenter of claim 33, wherein a First Virtual Storage Machine (FVSM) is utilized as primary storage and at least one Second Virtual Storage Machine (SVSM) is utilized as Redundancy to the First Virtual Storage Machine (FVSM).

40. The datacenter of claim 39, wherein the FVSM is in the first datacenter and the SVSM is in the second datacenter.

41. The datacenter of claim 39, wherein at least one Second Virtual Storage Machine (SVSM) is accessed by a First Client System (SM) using the network configuration for the First Virtual Storage Machine (FVSM) utilizing dynamic encapsulation to present the Second Virtual Storage Machine (SVSM) to the at least First Client System.

42. The datacenter of claim 32, wherein the plurality of OSI Layer 2 tags permits the association of Overlapping layer 3 routing tables each with the initial networking configuration for one or more one client system (CS).

43. The datacenter of claim 32, wherein the storage resources are accessed by one or more Virtual Network Interfaces (VNic) segregating data traffic by the plurality of OSI Layer 2 tags.

44. The datacenter of claim 43, wherein at least one Client Systems (CS) utilizes at least one Storage Volume (SV) by accessing at least one Virtual Network Interface (VNic).

45. The datacenter of claim 32, wherein the Storage Volume is accessed by a protocol selected from the group consisting of: Network File System (NFS), internet Small Computer System Interface (iSCSI), Fiber Channel Over Ethernet (FCoE), and Common Internet File System (CIFS).

46. The datacenter of claim 43, wherein at least one Virtual Network Interface (VNic) provides access to at least one Storage Volume (SV) accessed by at least one Client System (CS) at OSI Layer 3 or above.

47. The datacenter of claim 43, wherein the plurality OSI Layer 2 tags permit Client Systems (CS) to utilize storage resources in isolation from other Client Systems (CS).

48. A method for providing a datacenter having Layer 2 architecture to segregate and maintain original client Layer 2 configurations and permit software defined networking, comprising:
establishing within a first datacenter a first cloud computing environment having Layer 2 architecture to maintain a plurality of original client Layer 2 configurations, the first datacenter having first physical resources and first virtual resources structured and arranged to provide storage resources for allocation to at least two Client Systems (CS);
establishing within a second datacenter a second cloud computing environment having Layer 2 architecture to maintain a plurality of original client Layer 2 configurations, the second datacenter having second physical resources and second virtual resources structured and arranged to provide storage resources for allocation to at least two Client Systems (CS); and
coupling the first cloud computing environment to the second cloud computing environment by OSI Layer 2 as a data channel for the transfer of data frames, each frame having a plurality of OSI Layer 2 tags, the plurality of OSI Layer 2 tags permitting segregation between systems so at least two systems utilizing the coupled first datacenter and second datacenter may have overlapping network configurations.

49. The method of claim 48, further comprising:
coupling a plurality of Client Systems (CS) to the coupled first and second cloud computing environments, each Client System (CS) having a set of infrastructure resources and initial networking configuration, each Client System (CS) coupled to the first and second cloud computing environment by OSI Layer 2 for the transfer of data frames, each frame having a plurality of OSI Layer 2 tags, the coupled cloud computing environment thereby providing storage resources for allocation to at least two Client Systems (CS).

50. The method of claim 49, wherein the storage resources are accessed by one or more Virtual Storage Machines (VSM).

51. The method of claim 50, wherein the plurality of OSI Layer 2 tags permits one or more VSMs of the first datacenter to have overlapping network configurations with one or more VSMs of the second datacenter.

52. The method of claim 50, wherein at least one Client Systems (CS) utilizes at least one Storage Volume (SV) by accessing at least one Virtual Storage Machine (VSM).

53. The method of claim 52, wherein the Storage Volume (SV) is accessed by a protocol selected from the group consisting of: Network File System (NFS), internet Small Computer System Interface (iSCSI), Fiber Channel Over Ethernet (FCoE), and Common Internet File System (CIFS).

54. The method of claim 50, wherein at least one Virtual Storage Machine (VSM) provides at least one Storage Volume (SV) accessed by at least one Client System (CS) at OSI Layer 3 or above.

55. The method of claim 50, wherein the plurality OSI Layer 2 tags permit Client Systems (CS) to utilize storage resources in isolation from other Client Systems (CS).

56. The method of claim 50, wherein a First Virtual Storage Machine (FVSM) is utilized as primary storage and at least one Second Virtual Storage Machine (SVSM) is utilized as Redundancy to the First Virtual Storage Machine (FVSM).

57. The method of claim 56, wherein the FVSM is in the first datacenter and the SVSM is in the second datacenter.

58. The method of claim 49, wherein the storage resources are accessed by one or more Virtual Network Interfaces (VNic) segregating data traffic by the plurality of OSI Layer 2 tags.

59. The method of claim 58, wherein at least one Client Systems (CS) s at least one Storage Volume (SV) by accessing at least one Virtual Network Interface (VNic).

60. The method of claim 59, wherein the Storage Volume is accessed by a protocol selected from the group consisting of: Network File System (NFS), internet Small Computer System Interface (iSCSI), and Fiber Channel Over Ethernet (FCoE), and Common Internet File System (CIFS).

61. The method of claim 58, wherein at least one Virtual Network Interface (VNic) provides access to at least one Storage Volume (SV) accessed by at least one Client System (CS) at OSI Layer 3 or above.

62. The method of claim 58, wherein the plurality OSI Layer 2 tags permit Client Systems (CS) to utilize storage resources in isolation from other Client Systems (CS).

\* \* \* \* \*